(12) United States Patent
Stetson et al.

(10) Patent No.: US 10,713,258 B2
(45) Date of Patent: *Jul. 14, 2020

(54) SYSTEMS AND METHODS FOR VISUALIZING AND MANIPULATING GRAPH DATABASES

(71) Applicant: dRISK, Inc., Pasadena, CA (US)

(72) Inventors: Robert Chess Stetson, Pasadena, CA (US); Jacob Aptekar, Pasadena, CA (US)

(73) Assignee: dRISK, Inc., Pasadena, CA (US)

( * ) Notice: Subject to any disclaimer, the term of this patent is extended or adjusted under 35 U.S.C. 154(b) by 371 days.

This patent is subject to a terminal disclaimer.

(21) Appl. No.: 15/650,776

(22) Filed: Jul. 14, 2017

(65) Prior Publication Data

US 2017/0316059 A1 Nov. 2, 2017

Related U.S. Application Data

(63) Continuation of application No. 15/136,426, filed on Apr. 22, 2016, now Pat. No. 9,740,744, which is a
(Continued)

(51) Int. Cl.
*G06F 16/2455* (2019.01)
*G06F 16/248* (2019.01)
(Continued)

(52) U.S. Cl.
CPC ...... *G06F 16/24566* (2019.01); *G06F 16/248* (2019.01); *G06F 16/904* (2019.01); *G06F 16/9024* (2019.01); *G06F 16/9027* (2019.01)

(58) Field of Classification Search
USPC .......... 707/773, 607, 723, 771, 798
See application file for complete search history.

(56) References Cited

U.S. PATENT DOCUMENTS

| 5,844,572 A | 12/1998 | Schott |
| 7,539,697 B1 | 5/2009 | Akella |

(Continued)

FOREIGN PATENT DOCUMENTS

WO 2018010434 A1 1/2018

OTHER PUBLICATIONS

Meyerovich et al., "Superconductor: A Language for Big Data Visualization", ACM, LASH-C, Shenzen, China, Feb. 24, 2013.
(Continued)

*Primary Examiner* — Cam Linh T Nguyen
(74) *Attorney, Agent, or Firm* — KPPB LLP

(57) ABSTRACT

Systems and methods for visualizing and manipulating graph databases in accordance embodiments of the invention are disclosed. In one embodiment of the invention, a graph database manipulation device includes a processor and a memory configured to store a graph database manipulation application, wherein the graph database manipulation application configures the processor to obtain a graph database including a set of nodes and a set of edges, determine a source node within the set of nodes, locate a set of related nodes based on the source node and the set of edges, recursively locate a set of sub-related nodes based on the set of related nodes and the set of edges, generate a representation of the set of related nodes from the perspective of the source node, and recursively update the generated representation of the set of sub-related nodes from the perspective of the source node and the related nodes.

20 Claims, 15 Drawing Sheets

Related U.S. Application Data continuation of application No. 14/318,432, filed on Jun. 27, 2014, now Pat. No. 9,348,947.

(60) Provisional application No. 61/858,782, filed on Jul. 26, 2013.

(51) Int. Cl.
  *G06F 16/904* (2019.01)
  *G06F 16/901* (2019.01)

(56) References Cited

U.S. PATENT DOCUMENTS

| | | | |
|---|---|---|---|
| 7,644,052 B1 | 1/2010 | Chang et al. | |
| 7,865,534 B2 | 1/2011 | Chandra et al. | |
| 8,185,558 B1 | 5/2012 | Narayanan et al. | |
| 8,352,465 B1 | 1/2013 | Jing et al. | |
| 8,572,129 B1 | 10/2013 | Lee | |
| 8,739,016 B1 | 5/2014 | Goldman | |
| 9,129,158 B1 | 9/2015 | Medasani et al. | |
| 9,348,947 B2 | 5/2016 | Stetson et al. | |
| 9,411,890 B2 * | 8/2016 | Komarov | G06F 16/951 |
| 9,740,744 B2 | 8/2017 | Stetson et al. | |
| 9,792,530 B1 | 10/2017 | Wu et al. | |
| 2002/0087275 A1 | 7/2002 | Kim et al. | |
| 2007/0124291 A1 | 5/2007 | Hassan et al. | |
| 2007/0208693 A1 | 9/2007 | Chang et al. | |
| 2007/0239694 A1 | 10/2007 | Singh et al. | |
| 2008/0059512 A1 | 3/2008 | Roitblat et al. | |
| 2008/0097941 A1 | 4/2008 | Agarwal | |
| 2009/0013314 A1 | 1/2009 | Opaterny | |
| 2009/0303239 A1 | 12/2009 | Ang et al. | |
| 2010/0274815 A1 | 10/2010 | Vanasco | |
| 2011/0173189 A1 | 7/2011 | Singh et al. | |
| 2011/0249002 A1 | 10/2011 | Duplessis et al. | |
| 2012/0221555 A1 | 8/2012 | Byrne et al. | |
| 2012/0317149 A1 | 12/2012 | Jagota | |
| 2013/0191416 A1 | 7/2013 | Lee | |
| 2013/0246342 A1 | 9/2013 | Faith | |
| 2013/0290234 A1 | 10/2013 | Harris | |
| 2014/0149376 A1 | 5/2014 | Kutaragi et al. | |
| 2015/0033106 A1 | 1/2015 | Stetson et al. | |
| 2015/0254331 A1 | 9/2015 | Long et al. | |
| 2016/0239545 A1 | 8/2016 | Stetson et al. | |
| 2017/0131719 A1 | 5/2017 | Micks et al. | |
| 2017/0221240 A1 | 8/2017 | Stetson et al. | |
| 2018/0014217 A1 | 1/2018 | Kleinbeck et al. | |
| 2018/0189634 A1 | 7/2018 | Abdelaziz et al. | |

OTHER PUBLICATIONS

Torok, Matthew E., "Superconductor 1 Million Nodes at 30 FPS", Retrieved from: http://parlab.eecs.berkeley.edu/sites/all/parlab/files/superconductor%20overview%20external.pdf, Aug. 2012, 29 pgs.

International Search Report and Written Opinion for International Application No. PCT/US2019/050469, Search completed Nov. 20, 2019, dated Dec. 11, 2019, 9 Pgs.

Monti et al., "Geometric Deep Learning on Graphs and Manifolds Using Mixture Model CNNs", In: Cornell University Library/Computer Science/Computer Vision and Pattern Recognition, Nov. 25, 2016, (online) (retrieved on Nov. 19, 2019 (Nov. 19, 2019).

* cited by examiner

SYSTEMS AND METHODS FOR VISUALIZING AND MANIPULATING GRAPH DATABASES

CROSS-REFERENCE TO RELATED APPLICATIONS

The current application is a continuation of U.S. patent application Ser. No. 15/136,426, filed Apr. 22, 2016, which is a continuation of U.S. patent application Ser. No. 14/318, 432, filed Jun. 27, 2014, and issued as U.S. Pat. No. 9,348,947 on May 24, 2016, which claims priority to U.S. Provisional Patent Application Ser. No. 61/858,782, filed Jul. 26, 2013, the disclosures of which are hereby incorporated by reference in their entirety.

FIELD OF THE INVENTION

The present invention is generally related to data manipulation and more specifically the visualization and manipulation of data stored using graph databases.

BACKGROUND OF THE INVENTION

In computing, a graph is an abstract data structure including nodes and edges. A graph contains a set of nodes connected by one or more edges. Values can be associated with the nodes and/or the edges. A graph data structure is an implementation of the mathematical concept of a graph, which is a representation of a set of objects where some pairs of the objects are connected by links. Graphs can be undirected, where an edge indicates a relationship between two nodes within the graph. Graphs can also be directed, where an edge indicates a relationship between a first node and a second node within the graph, but not the corresponding relationship between the second node and the first node.

SUMMARY OF THE INVENTION

Systems and methods for visualizing and manipulating graph databases in accordance embodiments of the invention are disclosed. In one embodiment of the invention, a graph database manipulation device includes a processor and a memory configured to store a graph database manipulation application, wherein the graph database manipulation application configures the processor to obtain a graph database, wherein the graph database includes a set of nodes and a set of edges, wherein an edge in a set of edges defines a relationship between a first node in the set of nodes and a second node in the set of nodes and an edge includes edge weight metadata and edge display metadata, wherein the edge display metadata describes the spatial relationship between the first node and the second node, determine a source node within the set of nodes, locate a set of related nodes based on the source node and the set of edges, where a related node in the set of related nodes has an edge in the set of edges indicating a relationship between the related node and the source node, recursively locate a set of sub-related nodes based on the set of related nodes and the set of edges, where a sub-related node in the set of sub-related nodes has an edge in the set of edges indicating a relationship between a related node in the set of related nodes and the sub-related node, generate a representation of the set of related nodes from the perspective of the source node, where the representation of a related node in the subset of the set of related nodes is based on the edge weight metadata and the edge display metadata from the edge defining the relationship between the particular related node and the source node, and recursively update the generated representation of the set of sub-related nodes from the perspective of the source node and the set of related nodes, where the representation of a sub-related node in the set of sub-related nodes within the generated representation is recursively based on the edge weight metadata and the edge display metadata from the edge defining the relationship between the particular sub-related node and its predecessor nodes.

In an additional embodiment of the invention, the system further includes a display device and configured to display a visualization of a representation of nodes and edges within the graph database, wherein the graph database manipulation application further configures the processor to display the generated representation using the display device.

In another embodiment of the invention, the display of the generated representation further includes performing a recursive shift based on the relationship between the related nodes in the set of related nodes and the edge display metadata for the subset of edges defining the relationship between pairs of the related nodes in the set of related nodes.

In yet another additional embodiment of the invention, the display of the generated representation further includes performing a recursive transformation based on the relationship between the related nodes in the set of related nodes and the edge display metadata for the subset of edges defining the relationship between pairs of the related nodes in the set of related nodes.

In still another additional embodiment of the invention, the system further includes an input device configured to receive graph manipulation data, wherein the graph database manipulation application further configures the processor to modify the nodes and edges within the graph database based on the graph manipulation data and refresh the generated representation of the source node and the set of related nodes based on the modified graph database.

In yet still another additional embodiment of the invention, a node includes permission metadata, where the permission metadata describes a set of nodes that have access to the node and the graph database manipulation application further configures the processor to locate the set of related nodes for the source based on the permission metadata for the nodes in the set of related nodes.

In yet another embodiment of the invention, the graph database manipulation application further configures the processor to recursively locate the sub-related nodes in the set of sub-related nodes based on the permission data for the sub-related nodes.

In still another embodiment of the invention, the recursive location of sub-related nodes from a related node further includes receiving a set of related edges from a node having an edge in common with the related node based on the permission metadata for the node.

In yet still another embodiment of the invention, the edge weight metadata is a complex number having a real component and an imaginary component.

In yet another additional embodiment of the invention, the edge weight metadata represents a property selected from the group consisting of a spatial position, a color, and a size.

In still another additional embodiment of the invention, the meaning of the edge weight metadata is based on the generated representation of the nodes associated with the edge including the edge weight metadata.

In yet still another additional embodiment of the invention, the recursive update of the visualized representation is based on an accumulation of the weights of the sub-related nodes.

In yet another embodiment of the invention, a portion of the edge display metadata is convertible to a binary string.

In still another embodiment of the invention, the edge display metadata describes the relative layout of the nodes associated with the edge including the edge display metadata and wherein the generation of the representation of the set of related nodes and the set of sub-related nodes based on the perspective of the source node further includes recursively calculating the position of the representation of a sub-related node based on the edge display metadata for the sub-related node and the edge display metadata for nodes within the set of related nodes that are predecessor nodes to the sub-related node.

In yet still another embodiment of the invention, at least one third-party node in the set of nodes represents a third-party data source device and the at least one third-party node includes node metadata retrieved from the third-party data source device.

In yet another additional embodiment of the invention, the edge weight metadata for the edges in the set of edges that are connected to the at least one third-party node is based on the latency associated with retrieving the node metadata from the third-party data source device.

In still another additional embodiment of the invention, the edge weight metadata for the edges in the set of edges that are connected to the at least one third-party node is based on the latency associated with retrieving edge metadata from the third-party data source device.

In yet still another additional embodiment of the invention, the edge display metadata is calculated based on the related nodes and the sub-related nodes.

In yet another embodiment of the invention, the display metadata includes time data describing a time associated with the edge.

In still another embodiment of the invention, the generated representation includes a historical narrative of the set of nodes based on the time data.

In yet still another embodiment of the invention, at least one generated representation includes a partially overlapping subset of at least one other generated representation.

In yet another additional embodiment of the invention, at least one node in the set of nodes is configured to execute actions based on a received request.

In still another additional embodiment of the invention, the received request includes a request for the set of nodes related to the at least one node configured to execute actions and the at least one node configured to execute actions to identify nodes connected to the at least one node by at least one edge, generate a set of sub-related nodes based on the identified nodes and edges, where the set of sub-related nodes includes the sub-related nodes and the edges associated with the sub-related nodes and the at least one node, and transmit a portion of the generated set of sub-related nodes based on the received request.

Yet another embodiment of the invention includes method for visualizing graph databases including obtaining a graph database using a graph database manipulation device, wherein the graph database includes a set of nodes and a set of edges, wherein an edge in a set of edges defines a relationship between a first node in the set of nodes and a second node in the set of nodes and an edge includes edge weight metadata and edge display metadata, wherein the edge display metadata describes the spatial relationship between the first node and the second node, determining a source node within the set of nodes using the graph database manipulation device, locating a set of related nodes based on the source node and the set of edges using the graph database manipulation device, where a related node in the set of related nodes has an edge in the set of edges indicating a relationship between the related node and the source node, recursively locating a set of sub-related nodes based on the set of related nodes and the set of edges using the graph database manipulation device, where a sub-related node in the set of sub-related nodes has an edge in the set of edges indicating a relationship between a related node in the set of related nodes and the sub-related node, generating a representation of the set of related nodes from the perspective of the source node using the graph database manipulation device, where the representation of a related node in the subset of the set of related nodes is based on the edge weight metadata and the edge display metadata from the edge defining the relationship between the particular related node and the source node, and recursively updating the generated representation of the set of sub-related nodes from the perspective of the source node and the set of related nodes using the graph database manipulation device, where the representation of a sub-related node in the set of sub-related nodes within the generated representation is recursively based on the edge weight metadata and the edge display metadata from the edge defining the relationship between the particular sub-related node and its predecessor nodes.

DETAILED DESCRIPTION

Figure 1:
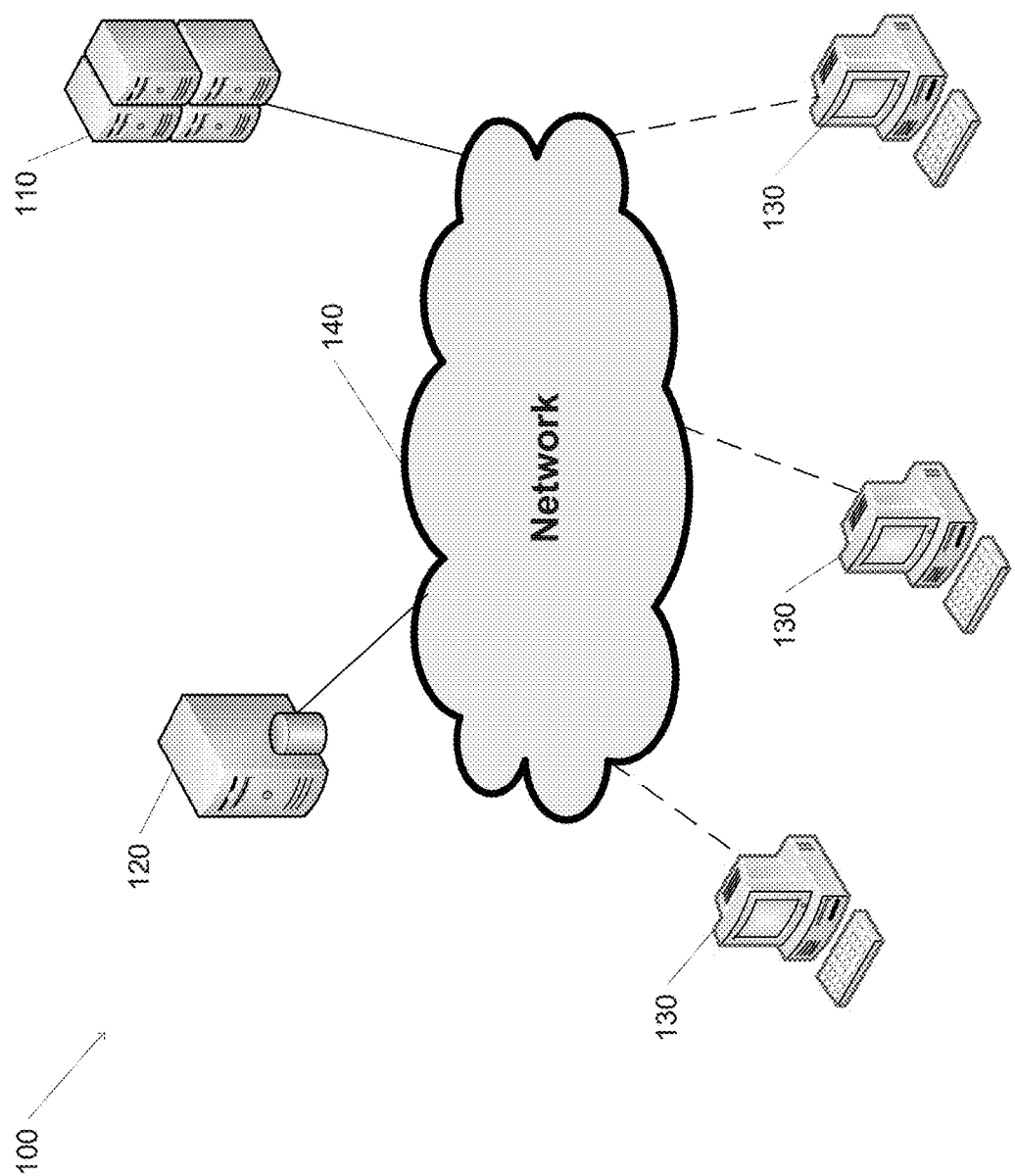
FIG. 1 conceptually illustrates a graph database manipulation system in accordance with an embodiment of the invention.

Turning now to the drawings, systems and methods for visualizing and manipulating graph databases in accordance with embodiments of the invention are illustrated. Text-based search has enjoyed great success in the last decade, yet paradoxically, it has failed to revolutionize data driven fields such as medicine. It can be difficult for users to conjure a search term if the user does not know exactly what information the user is searching for. Graph databases provide a user an opportunity to explore the relationships within a space of ideas. In this way, graph databases provide users with the ability to locate information that answers the user's question without having to formulate the search query to express the question. What is more, a user can encode new information into the graph by creating associations, or streamline existing information by pruning associations. These manipulations can improve the graph's usefulness as a record for the same user, and a means of sharing information with other users and computational agents that operate within the graph.

In a variety of embodiments, the analysis of natural data involve extensive use of set operations, such as but not limited to concatenating data sets thought to be similar, excluding outlier sets, and taking differences of sets to find exclusive elements. Graph databases in accordance with embodiments of the invention facilitate the execution of these set operations as successors of a node can be the set of its successors. Accordingly, graph database manipulation systems allow the successors of parent nodes to be combined, differenced, or otherwise manipulated in order to capture the set operations done in the analysis of naturalistic data. In a number of embodiments, these operations can be performed using visualizations of the data, rather than by querying the graph database using text-based queries. In several embodiments, the set of successors of a given node and their own links to each other encode an entire graph (e.g., a subgraph within the graph database) that has the complete set of attributes (e.g. the nodes, edges, and/or metadata) as any other subgraph within the database as well as the entire database itself. Accordingly, any operation designed to run on a given subgraph can also run on any other subgraph, thereby providing a mechanism by which general-purpose operators may be created and extended across the entire graph database. In this sense, a node perspective can extend to not only the immediate sub-nodes, but also recursively to their cross-links. In this way, the node perspective can operate as a fundamental unit of computation within the framework provided by a graph database manipulation system.

Graph database manipulation systems in accordance with embodiments of the invention are configured to visualize and manipulate graph databases. Graph databases contain a set of nodes defining concepts and a set of edges indicating relationships between pairs of nodes. The data stored within the nodes and/or edges can be locally stored within the graph database and/or stored on external devices. Graph database manipulation devices are configured to generate visualizations (or other representation) of the graph database from the perspective of one or more nodes (e.g. source node(s)) within the graph database. The graph database can also be visualized from a point outside of the graph. In several embodiments, the visualization becomes the perspective from a node in a new graph that larger by one node. In a variety of embodiments, a point outside of the graph corresponds to the perspective of a graph database manipulation device with respect to the graph database. The generated representation can be any of a variety of visualizations, such as but not limited to a tile-based histogram, a point cloud, an image, and a node-edge diagram, that can be explored and manipulated as appropriate to the requirements of specific applications in accordance with embodiments of the invention. Once a source node has been selected, related nodes are recursively located within the graph database based on the edges connecting the nodes. The number of related nodes so viewed can be limited by a preset threshold, determined dynamically by the resolution or readability limits of the system, or by processing constraints imposed to maintain the graph database manipulation device simultaneously across a network of portals. In a variety of embodiments, the threshold value is based on one or more nodes and/or edges selected within the graph database. The nodes and/or edges can be selected using a variety of techniques as appropriate to the requirements of specific applications in accordance with embodiments of the invention, such as receiving a selection of nodes and/or edges using an input device configured to receive data indicative of node and/or edge selections within a graph database manipulation device. In several embodiments, the nodes and/or edges selected as related nodes can be based on the statistics (e.g. patterns within the relationships between the nodes and edges from the perspective of the source node) of the surrounding data. The visualization of the generated representation includes a representation of the nodes and the layout and visual appearance of the generated representation can be based on edge weight metadata and edge display metadata contained in the edges connecting the nodes being visualized. In several embodiments, the threshold value can be based on the visualized representation of the nodes, e.g. the threshold can be based on readability metric(s) and/or the amount of visualized space the node consumes as displayed using a graph database manipulation device. In a variety of embodiments, a one-to-one mapping exists between the edge display metadata and some particular perspective of the associated data (e.g. the visualized representation of that data). For example, the color of nodes being assigned dynamically from the output of a calculation (for example, k-means clustering) on the node weights in a particular perspective in a particular fashion. In a number of embodiments, the edge display metadata for any entity within the graph (i.e. an edge or a node) can be statically and/or dynamically generated.

Based on the nodes and the edges connecting the nodes, emergent data describing the relationships between the nodes can be determined that provides additional context and/or description of the nodes and edges. This emergent data can be utilized to provide additional insights into the data and/or additional visualizations of the graph database, such as by changing the format in which the data are viewed, or the affordances given to the user for manipulating the graph. In several embodiments, manipulating the graph database includes creating, deleting, and/or modifying links between nodes within the database. In this way, the links between the nodes can be utilized to encode processes, workflows, and any other data as appropriate to the requirements of specific applications of embodiments of the invention. In a variety of embodiments, a one-to-one mapping between the underlying graph database and the visualized representation of the graph database allows for the modifications to the visualized representation to be incorporated into the underlying graph database. In many embodiments, the emergent data includes aggregations of the relationships between the nodes as described by the edges from the perspective of the source node. In several embodiments, time metadata is associated with nodes and/or edges within the graph database. In a number of embodiments, particularly in those with multiple users, the use of time metadata allows the graph database to be visualized as a historical narrative and/or a communication system. Additionally, the time metadata can be utilized to impose ordering and/or sequencing on the visualized representation of the graph database, such as when chaining multiple operators together in the graph that need to act in sequence. However, it should be noted that any metadata can be associated with the nodes and/or edges that can be used to facilitate the visualization and/or manipulation of graph databases as appropriate to the requirements of specific applications of the invention.

In a variety of embodiments, the data associated with a node within the graph database is calculated based on data present within the node and/or nodes related to the node within the graph database. Node messages can be transmitted between nodes within the database in order to request additional and/or updated data from the nodes. These messages can be utilized to facilitate communication between the nodes and/or between graph database manipulation devices visualizing (related) graph database(s) as appropriate to the requirements of specific applications in accordance with embodiments of the invention. In several embodiments, the nodes are configured to transmit node message responses containing the data requested in the node message. The processing and response to node messages can be influenced by permission metadata associated with the nodes. In this way, nodes within the graph database can be utilized as computation devices that provide requested data in response to a received node message.

During the exploration of the graph database, changes can be made to the generated representation(s) that can be applied to the nodes and edges within the graph database. In many embodiments, the nodes and/or edges have permission metadata describing what data (e.g. the node metadata and/or edges connected to the node) a node and/or edge will provide in the recursive location and/or modification of the nodes and/or edges. For example, a node can be connected to several related nodes (where the node metadata for the node is an aggregation of the node metadata for the related nodes) and the permission metadata for the node will return the node metadata but not the edges linking to the related nodes. Permission metadata can be global, based on the source node, and/or based on the related nodes as appropriate to the requirements of specific applications in accordance with embodiments of the invention. The modification of the graph database can respect (or ignore) any permission metadata associated with the nodes and/or edges as appropriate to the requirements of specific applications in accordance with embodiments of the invention. The permission metadata can be utilized to implement a security model within the graph database so that particular nodes and/or graph database manipulation devices only have access to portions of the data stored within the graph database, while the remaining data remains secured away. The security model limits the unauthorized disclosure of potentially sensitive and/or private data that can be stored within the graph database while keeping the sensitive and/or private data within the graph database for other allowable uses. For example, a "gateway" node can act as a bottleneck based on its security permissions, providing a limited set of data to the other nodes within the graph database while limiting access to potentially sensitive nodes related to the gateway node within the graph database.

In a variety of embodiments, the relationships between the nodes and edges within a graph database can be described using an ontology in that the edges represent a relationship between two nodes within the graph database. Graph database manipulation devices are configured to identify an ontology based on the perspective of a source node within the graph database. That is, the ontology describing the relationships between nodes and edges within the graph database depends on the source node utilized to explore the graph database and/or emergent data determined based on the relationships between the nodes from the perspective of the source node. In this way, the same edges and nodes can indicate different relationships based on the perspective of the node utilized to explore the graph database. In a number of embodiments, the ontology of the graph database can be described locally based on the perspective of a source node in that the ontology of the graph database in determined based on the relationships between the nodes and edges (along with any emergent data) within the local perspective of the source node.

Although the above is described with respect to a graph having edges that connect a pair of nodes, a variety of data structures, including hypergraphs where edges connect any number of nodes within the graph database, can be utilized as appropriate to the requirements of specific applications in accordance with embodiments of the invention. Similarly, a variety of graph database visualizations not specifically described above can be utilized as appropriate to the requirements of specific applications in accordance with embodiments of the invention. Systems and methods for visualizing and manipulating graph databases in accordance with embodiments of the invention are discussed below.

System Overview

Graph database manipulation systems in accordance with embodiments of the system are configured to facilitate the creation, manipulation, and interaction with graph databases. In a variety of embodiments, graph database manipulation systems include graph database manipulation devices configured to facilitate this functionality. In several embodiments, graph database manipulation device includes a processor and a memory configured to store a graph database manipulation application, wherein the graph database manipulation application configures the processor to obtain a graph database, wherein the graph database includes a set of nodes and a set of edges, wherein an edge in a set of edges defines a relationship between a first node in the set of nodes and a second node in the set of nodes, and metadata describing a numeric value attributed to an edge or node that can be pre-assigned as a static attribute of the node or edge stored in memory and/or calculated as a function of the connection patterns of nodes and edges to be found within one or more degrees of separation to the node or edge. In a number of embodiments, the graph database manipulation application further configures the processor to determine a source node within the set of nodes, locate a set of related edges connected to the source node, locate the nodes to which those edges in turn connect, and, the above constituting the perspective of the source node within the graph, whereby the perspective, encodes all edges connected to the source node, encodes all additional nodes connected to these edges, can encode recursively, in the above manner, all edges and nodes within one or more degrees of separation from the source node, can extend the above recursive encoding, based on the content of the intervening node or edge metadata, can represent overlapping subsets of node data or metadata which can be encoded in other such perspectives, and continuously update the above described generated representations of the set of sub related nodes, edges and metadata from the source node (i.e. the perspective). In several embodiments, the graph database manipulation application permits the creation, deletion, and modification of nodes within the graph database, edges within the graph database, and metadata within the graph database, whereby the so created and/or deleted and/or modified edges and/or metadata will also augment, prune and/or modify the relevant perspective(s) of the graph database.

In a variety of embodiments, graph database manipulation devices also include a display device and configured to display a visualization of a representation of nodes and edges within the graph database, wherein the graph database manipulation application further configures the processor to display the generated representation using the display device. In many embodiments, the display of the generated representation further includes a recursive operation based on the relationship between the related nodes, edges and metadata, whereby the spatial relationship between a source node to the nodes in its perspective can be represented by a graphical operation, such as a shift, scaling, and/or other mathematical transformation based on intervening edges, nodes and metadata such that these graphical operations can also be continued forward recursively to one or more degrees of separation in the graph. In a number of embodiments, graph database manipulation devices also include input device(s) configured to receive graph manipulation data, wherein the graph database manipulation application further configures the processor to modify the nodes and edges within the graph database based on the graph manipulation data and in particular modify nodes and/or edges and/or metadata within the graph such that actions taken by the user are transformed into the domain of the graph database directly, via an inversion of the transformations, and/or via an inversion of the calculations of the metadata described and refresh the generated representation of the source node and the set of related nodes based on the modified graph database.

In several embodiments, the nodes and edges can be utilized in a computing capacity whereby a node can be imbued with a capacity to automatically generate and/or modify edges in its perspective, thereby augmenting or pruning its perspective and gaining access to and/or relinquishing information encoded in the edges, nodes and metadata in the graph by using a rule or mathematical function based on the edges, nodes and metadata encoded in its current perspective. For example, a node within the graph database can correspond to a client device capable of processing received data and transmitting data describing other computing devices to which the client device can communicate. Similarly, a node can include the capability of executing requests for data (e.g. identifying related nodes within the graph database and/or providing access to secondary nodes connected to the node via one or more edges) and returning responses to those requests based on the received request. In this way, a node can dynamically present some or all of the requested data (e.g. subgraph within the graph database) using the computing capability of the node itself. It should be noted, however, that the requested data can also be generated in response to the received request as appropriate to the requirements of specific applications of embodiments of the invention. In a variety of embodiments, the graph database manipulation application further configures the processor to locate the set of related nodes for the source (the perspective of the source) based on the permission metadata for the nodes in the set of related nodes, including permissions assigned to the nodes, and permissions assigned to the edges. In several embodiments, permission data can be encoded as numerical key and/or bitmask metadata and/or graph structural data, including permission nodes that permit connections between nodes in the set of related nodes within their perspective. In many embodiments, the graph database manipulation application further configures the processor to recursively locate the sub related nodes in the set of sub related nodes based on the permission data for the sub related nodes and/or based on permissions. In a number of embodiments, the metadata is a complex number having a real component and an imaginary component. In several embodiments, the metadata represents a property selected spatial position, a color, and/or a size. In a variety of embodiments, the metadata is a binary string.

In many embodiments, the determination of the extent of the recursive perspective can be based upon the product of the accumulated weights of the magnitude of the edge weight metadata. In a variety of embodiments, the edge display metadata describes the relative layout of the nodes associated with the edge including the edge display metadata and the generation of the representation of the set of related nodes and the set of sub related nodes based on the perspective of the source node further includes recursively calculating the position of the representation of a sub related node based on the edge display metadata for the sub related node and the edge display metadata for nodes within the set of related nodes that are predecessor nodes to the sub related node. In several embodiments, the metadata available in a given perspective can be approximated such that an approximated perspective can be displayed to the user, an approximated version of the edge weight metadata can be used for calculations based on the graph database.

In a number of embodiments, at least one third party node in the set of nodes represents a third party data source device and the at least one third party node includes node metadata retrieved from the third party data source device. In many embodiments, the edge weight metadata for the edges in the set of edges that are connected to the at least one third party node can be based on the time of acquiring data about the node, the latency associated with retrieving the node metadata from the third party data source device, and/or another property related to time and/or space from which other properties related to time and space, such as order or sequence, can be interpreted.

Graph Database Manipulation Systems

Graph database manipulation systems in accordance with embodiments of the invention are configured to visualize and manipulate graph databases. A conceptual illustration of a graph database manipulation system in accordance with an embodiment of the invention is shown in FIG. 1. The graph database manipulation system 100 includes a graph database manipulation device 110 connected to a graph database server system 120 and, in a variety of embodiments, one or more data source devices 130 via network 140. In many embodiments, the graph database manipulation device 110 and the graph database server system 120 are implemented using a single server. In a variety of embodiments, the graph database manipulation device 110 and/or the graph database server system 120 are implemented using a plurality of servers. In many embodiments, data source devices 130 are implemented utilizing the graph database server system 120. In a number of embodiments, data source devices 130 include any of a variety of network-connected devices, including third-party data source devices, as appropriate to the requirements of specific applications in accordance with embodiments of the invention. Network 140 can be one or more of a variety of networks, including, but not limited to, wide-area networks, local area networks, and/or the Internet as appropriate to the requirements of specific applications in accordance with embodiments of the invention.

The graph database manipulation device 110 is configured to obtain a graph database (or a portion thereof) from the graph database server system 120. The graph database server system 120 is configured to obtain the nodes and edges contained within the graph database(s), including data source devices 130, the graph database manipulation device 110, and any other source of graph data as appropriate to the requirements of specific applications in accordance with embodiments of the invention. The graph database contains a set of nodes and a set of edges representing the relationships between the nodes. In a variety of embodiments, nodes include node metadata indicating the content of the node and edges include edge weight metadata and edge display metadata. It should be noted that any of a variety of data could be incorporated into the nodes and/or edges as appropriate to the requirements of specific applications in accordance with embodiments of the invention. In a variety of embodiments, the graph database contains one or more references (such as a uniform resource locator) to nodes and/or edges that are stored in a distributed fashion across multiple systems, including third-party systems.

The graph database manipulation device 110 is further configured to generate a representation of the graph database from the perspective of a node within the graph database. The representation of the graph database includes a set of related nodes recursively identified based on the source node and the edges connecting the source node and the related nodes. In a variety of embodiments, the nodes and/or edges within the graph database have permission metadata determining which nodes and edges are available to be included within the perspective of the source node. The layout of the generated representation can be based on the edge weight metadata and the edge display metadata contained in the edges while the content of the generated representation can be based on node metadata contained in the nodes. In many embodiments, the graph database manipulation device 110 is configured to display a visualization of the generated representation using a display device. The visualization of the representation can be based on the source node, the edge weight metadata, and the edge display metadata in that a particular set of nodes can have a different context (and therefore a different visualized representation) based on the source node. In several embodiments, the generated representation approximates the nodes and/or edges contained in the graph database. Techniques for approximating a graph database from the perspective of a source node that can be utilized as appropriate to the requirements of specific applications in accordance with embodiments of the invention are described in more detail below.

A variety of manipulations can be performed on the generated representation using the graph database manipulation device 110 as appropriate to the requirements of specific applications in accordance with embodiments of the invention, including those described in more detail below. The graph database manipulation device 110 modifies the graph database based on the received manipulations, thereby recursively modifying the nodes and edges present in the graph database. In those embodiments where one or more nodes and/or edges are references to a data source device 130, the graph database manipulation device 110 is configured to transmit the modifications to the nodes and/or edges to the data source device 130 to be applied.

Graph database manipulation systems in accordance with embodiments of the invention are described above with respect to FIG. 1; however, any of a variety of graph database manipulation systems can be utilized in accordance with embodiments of the invention. Systems and methods for visualizing and manipulating graph databases in accordance with embodiments of the invention are discussed below.

Graph Database Manipulation Devices

Figure 2:
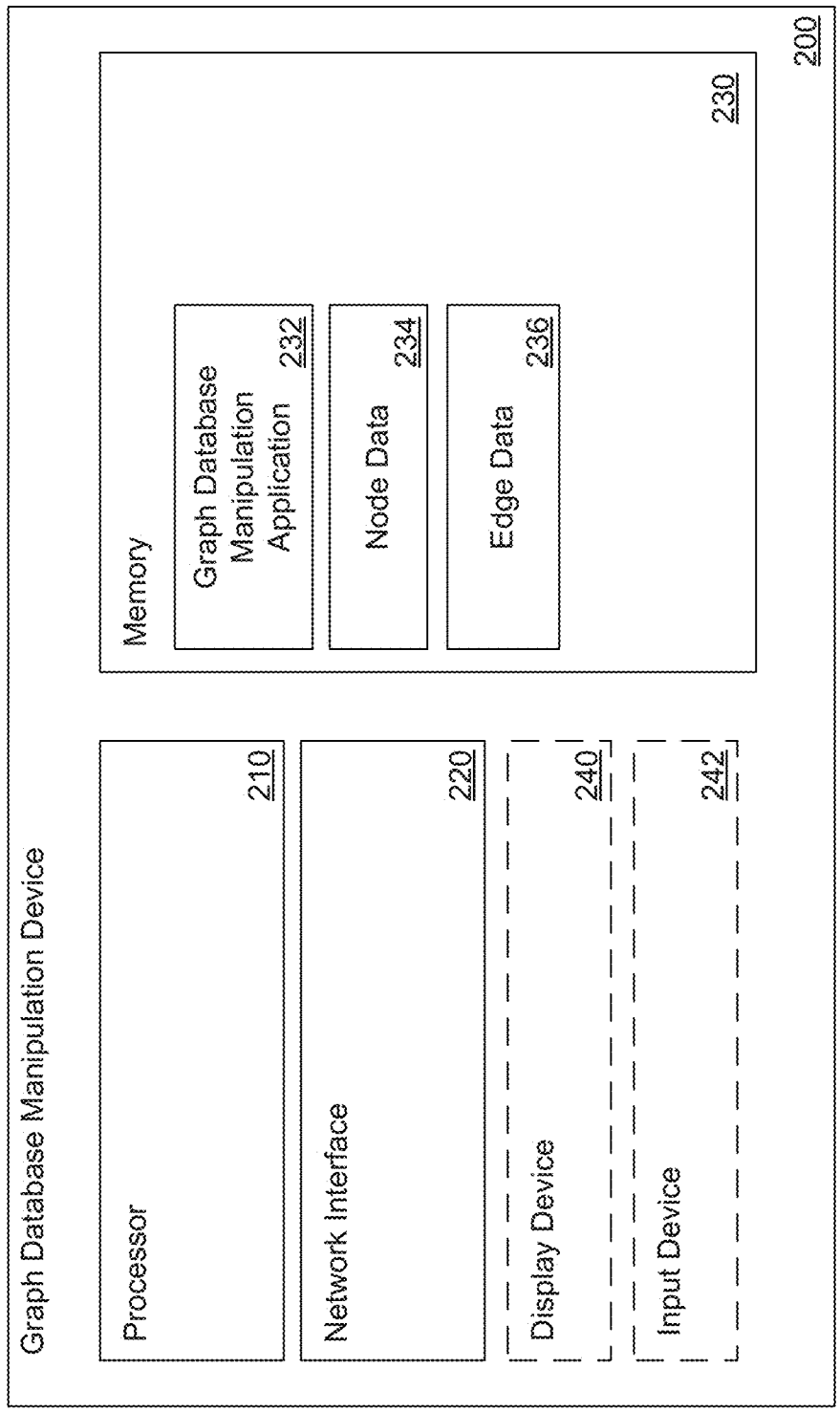
FIG. 2 conceptually illustrates a graph database manipulation device in accordance with an embodiment of the invention.

In many cases, a representation of a graph database is generated and visualized to enable a user to explore the graph database. Graph database manipulation devices are configured to generate representations of a graph database from the perspective of one or more source nodes and manipulate the graph database based on modifications to the generated representations. A graph database manipulation device in accordance with an embodiment of the invention is conceptually illustrated in FIG. 2. The graph database manipulation device 200 includes a processor 210 in communication with a memory 230. The processor 210 can include any of a variety of single core, multi-core, and/or parallel processing engines as appropriate to the requirements of specific applications in accordance with embodiments of the invention. The graph database manipulation device 200 also includes a network interface 220 configured to send and receive data over a network connection. In a number of embodiments, the network interface 220 is in communication with the processor 210 and/or memory 230. In several embodiments, the memory 230 is any form of storage configured to store a variety of data, including, but not limited to, graph database manipulation application 232, node data 234, and edge data 236. In many embodiments, the node data 234 and/or the edge data 236 are stored using an external server system and received by the graph database manipulation device 200 using the network interface 220. External server systems in accordance with a variety of embodiments include, but are not limited to, graph database server systems, database systems, and other distributed storage services as appropriate to the requirements of specific applications in accordance with embodiments of the invention.

The graph database manipulation application 232 configures processor 210 to perform a graph database manipulation processes based on the node data 234 and the edge data 236. In many embodiments, the node data 234 and the edge data 236 include the set of nodes and/or set of edges contained within a graph database (or a portion thereof). The graph database manipulation process includes determining one or more source nodes within the node data 234, recursively locating a set of related nodes in the node data 234 based on edges describing relationships between the nodes in the edge data 236, and generating a representation of the graph database from the perspective of the source node and including the related nodes. The layout of the nodes within the generated representation can be based on the edge weight metadata and the edge display metadata contained within the edges relating the nodes in the generated representation. Techniques for generating the representation of the nodes based on the edge weight metadata and the edge display metadata (including techniques for approximating the representation of the nodes and edges) that can be utilized in accordance with embodiments of the invention are described in more detail below. The generated representation of a node can include node metadata associated with the node describing the concept represented by the node within the graph database. In a variety of embodiments, the graph database manipulation device 200 includes a display device 240 connected to the processor 210 and configured to display a visualization of the generated representation. In many embodiments, the node data 234 and/or edge data 236 has permission metadata associated with the nodes and/or edges. The locations of related nodes and/or the generation of the representation of the located nodes are based on the permission metadata, where a node and/or edge cannot be included in the location of related nodes if the permission thresholds indicated in the permission metadata are not met.

The graph database manipulation process further includes receiving modifications to the generated representation. In several embodiments, the graph database manipulation device 200 includes an input device 242 configured to receive input indicative of modifications to the generated representation. The input device 242 is also configured to receive input indicative of a source node within a graph database. The input device 242 includes keyboards, mice, cameras, touch interfaces, and any other input device as appropriate to the requirements of specific applications in accordance with embodiments of the invention. Based on the modifications to the generated representation, the node data 234 and/or the edge data 236 are updated as appropriate to the received modifications. In embodiments where the node data 234 and/or edge data 236 are stored using a remote graph database server system, the graph database manipulation process configures the processor 210 to transmit the modifications using the network interface 220. When the nodes and/or edges include permission metadata, the manipulation of the node data 234 and/or edge data 236 (including the transmission of the manipulations) can be based on the permission metadata. For example, if a node has read-only permissions defined in the permission metadata, the graph database manipulation process could not allow modifications to the node data within the visualized representation and/or not update (or transmit) the node data 234 and/or the edge data 236 based on the received modifications.

Graph database manipulation devices in accordance with embodiments of the invention are described above with respect to FIG. 2; however, any of a variety of architectures, including those that store data or applications on disk or some other form of storage and are loaded into the memory at runtime can be utilized in accordance with embodiments of the invention. Processes for the visualization and manipulation of graph databases in accordance with embodiments of the invention are described below.

Generating Graph Databases

Figure 3:
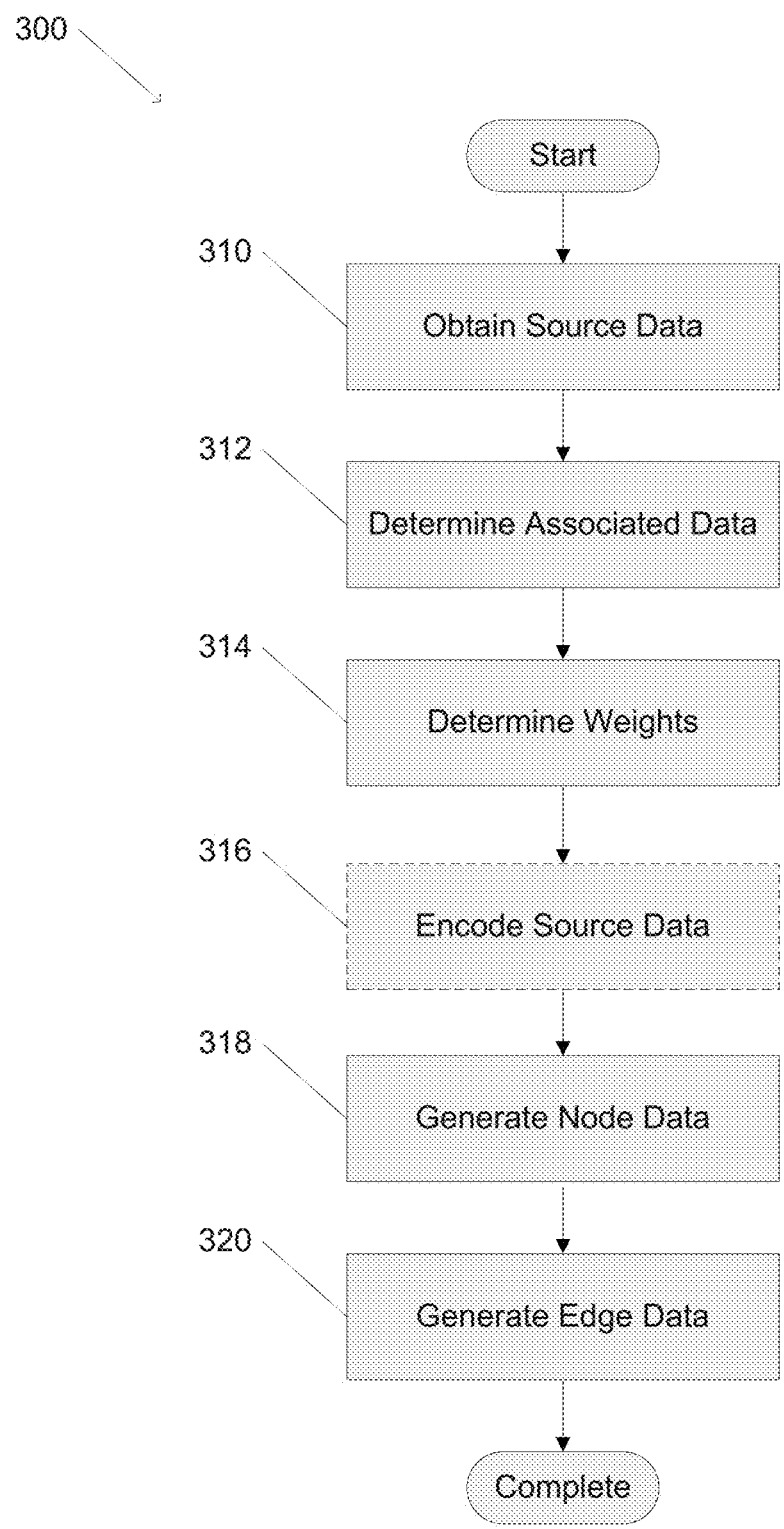
FIG. 3 is a flow chart conceptually illustrating a process for generating a graph database in accordance with an embodiment of the invention.

Graphs contain nodes and edges describing the relationships between the nodes. A graph-based representation of data can be explored by analyzing the nodes and the relationships between the nodes to gain insight into the underlying concepts and relationships. Graph databases in accordance with embodiments of the invention are configured to store conceptual data in nodes and the relationships between the nodes in the edges. Graph databases are utilized by graph database manipulation devices to visualize and manipulate the graph databases as appropriate to the requirements of specific applications in accordance with embodiments of the invention. A process for generating a graph database based on source data in accordance with an embodiment of the invention is conceptually illustrated in FIG. 3. The process 300 includes obtaining (310) source data. Associated data is determined (312) and weights are determined (314). In many embodiments, the source data is encoded (316). Nodes are generated (318) and edges are generated (320).

The obtained (310) source data includes concepts and relationships between the concepts. Source data can be obtained (310) from any of a variety of data sources, such as data source devices, user input indicative of concepts and relationships, and any other data source as appropriate to the requirements of specific applications in accordance with embodiments of the invention. In many embodiments, the obtained (310) source data includes permission data describing the permissions associated with the concepts and/or relationships within the source data. The determined (312) associated data can include determining relationship weights and/or display data based on the obtained (310) source data. In several embodiments, the determined (312) associated data is included in the obtained (310) source data. The determined associated (312) data can also include determining relationships between concepts in the obtained (310) source data. In a number of embodiments, determining (312) associated data includes determining permission metadata based on the obtained (310) concepts, relationships, and/or the data source providing the source data. The permission metadata can include a security mechanism (e.g. a password, a security token, a handshake protocol, and/or a message) for accessing some or all of the data associated with a node, the neighbors associated with the node (e.g. nodes within a graph database having edges in common with the node), and/or payment thresholds as appropriate to the requirements of specific applications in accordance with embodiments of the invention. For example, a node can have permission metadata that provides a first set of node (meta) data for free, while if a payment is made the node will provide a second set of node (meta)data and/or edges indicating relationships to other nodes.

The determined (314) weights can be based on a variety of factors as appropriate to the requirements of specific applications in accordance with embodiments of the invention, such as the obtained concepts, the relationships between the concepts, and the determined (312) associated data. Encoding (316) source data includes encoding the relationship weights into edge weight metadata and/or encoding the display data into edge display metadata. In a number of embodiments, the relationships weights are encoded into edge weight metadata as a complex number (e.g. a number with a real component and an imaginary component) and the display data is encoded into edge display metadata as a binary string. It should be noted, however, that the encoding (316) of edge weight metadata and edge display metadata can be any format, including real numbers and character strings, as appropriate to the requirements of specific applications in accordance with embodiments of the invention. Furthermore, the edge display metadata and the edge weight metadata can be a single piece of metadata as appropriate to the requirements of specific applications of embodiments of the invention. The generated (318) node data includes concepts from the obtained (310) source data. In several embodiments, the generated (318) node data includes node metadata (including a string representing the concept represented by the node data) and references to one or more pieces of edge data. The character string can be taken from the obtained (310) source data and/or be an aggregation of related concepts within the source data. The generated (320) edge data includes the relationships contained within the obtained (310) source data and/or determined (312) associated data. A generated (320) piece of edge data includes the determined (314) edge weight metadata and the edge display metadata for the relationship used to generate the edge data. In a variety of embodiments, the generated (318) node data and/or the generated (320) edge data includes permission metadata. The generated (318) node data and/or the generated (320) edge data can also include latency metadata describing a time associated with retrieving data from the node and/or edge, such as a communication latency and/or a processing latency as appropriate to the requirements of specific applications in accordance with embodiments of the invention.

Although specific processes for the generation of graph databases are discussed above with respect to FIG. 3, any of a variety of processes, including those that provide alternative permission mechanisms and those that store additional metadata in the generated nodes and/or edges, can be performed in accordance with embodiments of the invention. Processes for visualizing and manipulating graph databases in accordance with embodiments of the invention are described below.

Visualizing Graph Databases from Source Nodes

Figure 4:
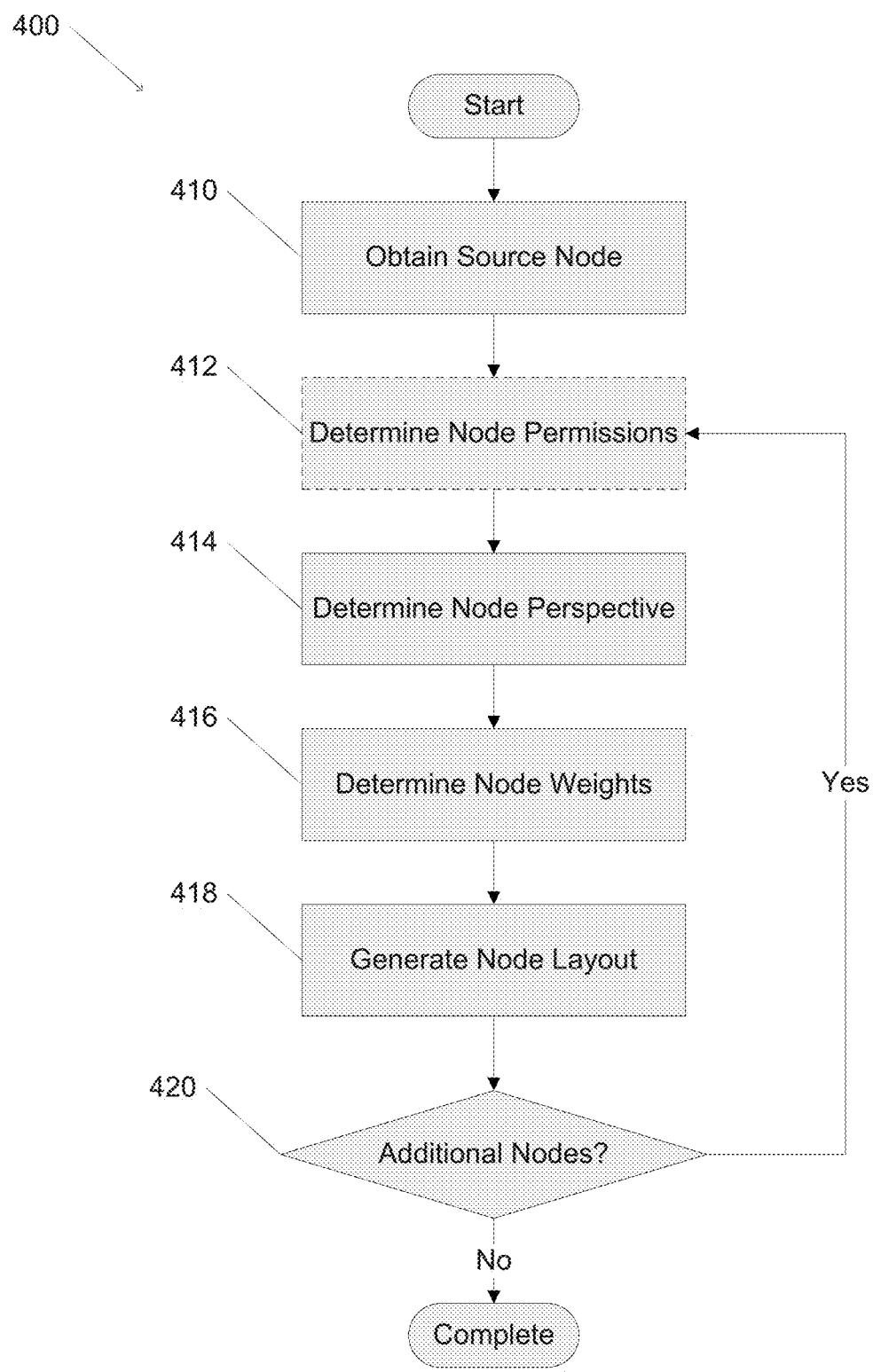
FIG. 4 is a flow chart conceptually illustrating a process for representing a graph database from the perspective of a source node in accordance with an embodiment of the invention.

In order to effectively explore a graph database, it is useful to generate a representation of the graph database from the perspective of a source node. This representation can then be visualized and explored to traverse the concepts and relationships contained within the graph database. Graph database manipulation devices in accordance with embodiments of the invention are configured to generate and visualize representations of graph databases. A process for visualizing a graph database in accordance with an embodiment of the invention is conceptually illustrated in FIG. 4. The process 400 includes obtaining (410) a source node. In many embodiments, node permissions are determined (412). The perspective of the node is determined (414). Node weights are determined (416) and a node layout is generated (418). If additional nodes exist (420), node permissions are determined (412) or the node perspective is determined (414) as appropriate to the specific embodiment of the invention.

A source node can be obtained (410) from within the graph database. In many embodiments, the obtained (410) source node corresponds to a user of a graph database manipulation device, although any node within the graph database can be the obtained (410) source node as appropriate to the requirements of specific applications in accordance with embodiments of the invention. In several embodiments, obtaining (410) a source node includes obtaining a portion of the data (e.g. a summary and/or a preview) of the data associated with the source node within the graph database. In a variety of embodiments, the obtained (410) source node is a node not present within the graph database that is virtually linked to one or more nodes within the graph database. In several embodiments, the permissions for the source node are determined (412) based on permission metadata in the source node. In a number of embodiments, the permissions for the source node are determined (412) based on the graph database manipulation device visualizing the graph database; other permissions can be determined (412) as appropriate to the requirements of specific applications in accordance with embodiments of the invention.

The perspective of the source node is determined (414) by recursively traversing the graph database. A number of techniques can be utilized to traverse the graph in accordance with embodiments of the invention, including, but not limited to, depth-first search (DFS), breadth-first search (BFS), iterative deepening DFS, depth-limited DFS, lexicographic BFS, beam search, and best-first search. Other techniques, including path finding techniques, can be utilized as appropriate to the requirements of specific applications in accordance with embodiments of the invention. A variety of factors can be utilized to define (e.g. limit) the perspective of the source node, including a distance threshold for a related node to the source node (measured by the edges between the nodes in the graph database), a time threshold based on the time taken to traverse the graph database, and/or permission metadata associated with the nodes and/or edges within the graph database. From the perspective of a first node, nodes within one edge of the first node can be known as related nodes, while nodes in excess of one edge from the first node can be known as sub-related nodes. Node weights are determined (416) based on the edge weight metadata included in the edges connecting the related nodes to the source node. In a variety of embodiments, the node weight for a particular related node is determined (416) based on the node weight for its predecessor node (e.g. the node traversed prior to the particular related node during the determination (414) of the node perspective) and the edge weight metadata for the edge connecting the particular related node and its predecessor node. A node layout can be generated (418) based on the determined node weight and the edge display metadata for the edge connecting the particular related node and the predecessor node. In many embodiments, the node weight determines the size (e.g. area) of the node within the generated (418) layout and the edge display metadata determines the position of the nodes within the generated (418) layout. Visual characteristics for the layout (e.g. color, shading, shape) of the node within the generated (418) layout can be determined utilizing the edge weight metadata and/or the edge display metadata. In a number of embodiments, the visual characteristics are encoded in a binary string. In many embodiments, the visual characteristics are encoded as a complex number. The size, position, and/or visual characteristics of a node can be absolute (e.g. the same regardless of layout) or dependent on the source node and/or other related nodes within the generated representation. For example, the position of the generated (418) layout for a particular node can depend on the other nodes being (or previously) laid out. In many embodiments, the node layout depends on the node metadata for the node(s) being laid out. The above process repeats until no additional nodes exist (420) in the perspective of the obtained (410) source node.

Figure 8A:
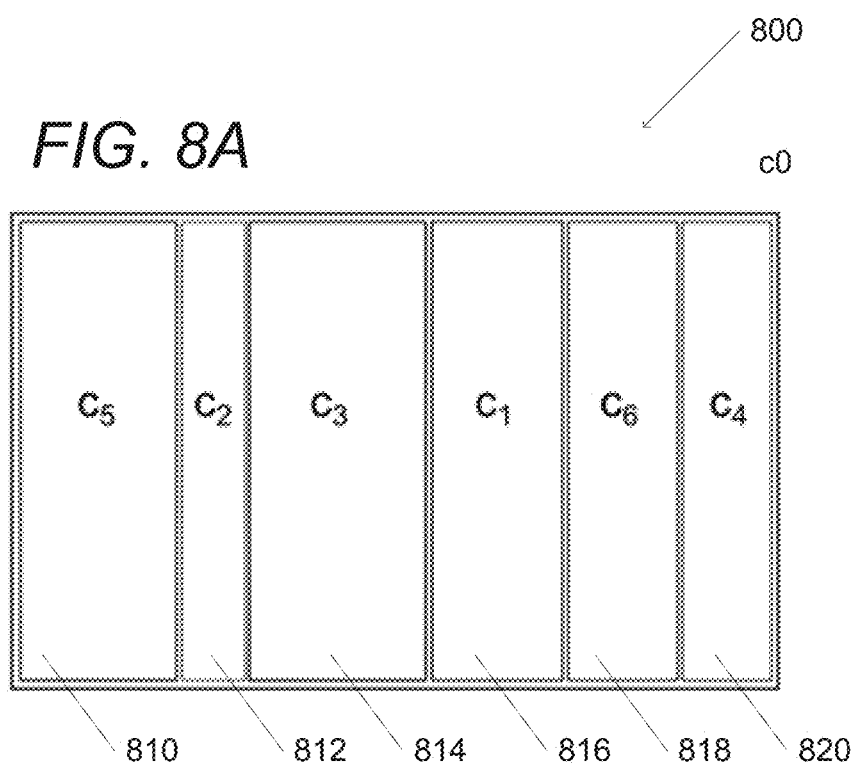
FIGS. 8A and 8B conceptually illustrate visualizations of a representation of a graph database in accordance with embodiments of the invention.
Figure 8B:
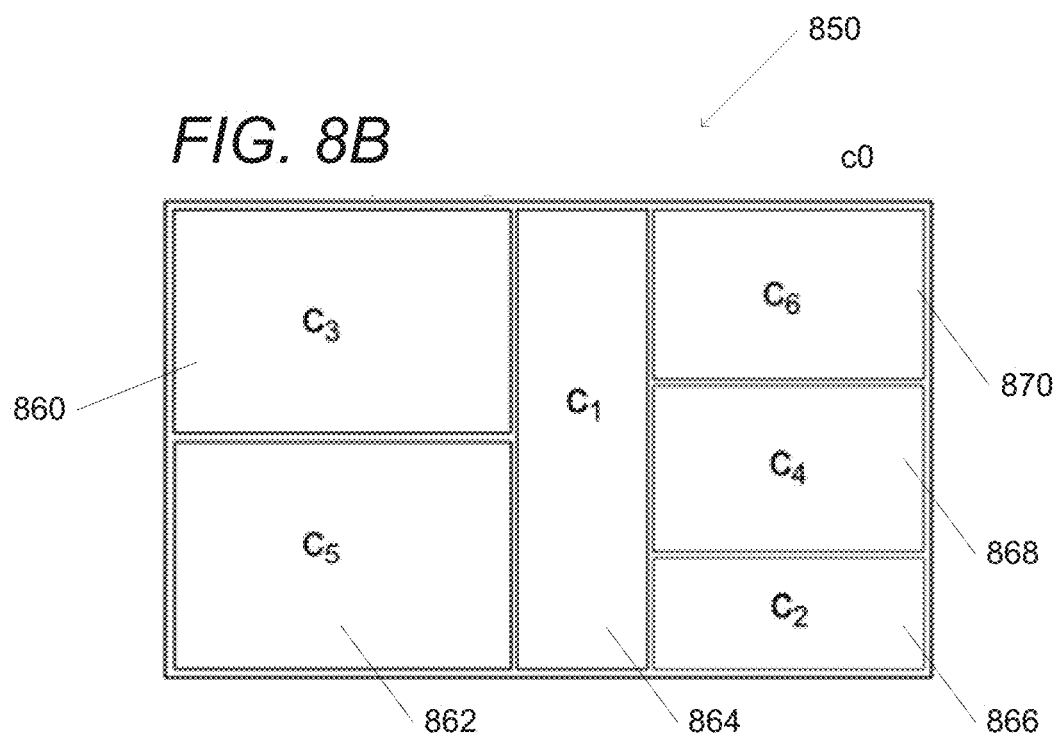

Turning now to FIG. 8A, an example of a node layout for a representation for a source node within a graph database in accordance with an embodiment of the invention is conceptually illustrated. FIG. 8A shows a generated representation of a graph database from the perspective of a source node c0 with related nodes c1, c2, c3, c4, c5, and c6, where nodes c1-c6 are connected via edges to source node c0. The generated representation 800 includes the node layout using boxes c5 810, c2 812, c3 814, c1 816, c6 818, and c4 820. The sizes of the boxes c5 810, c2 812, c3 814, c1 816, c6 818, and c4 820 are determined based on the edge display metadata in the edges connecting nodes c1-c6 to c0. The left-to-right layout of boxes c5 810, c2 812, c3 814, c1 816, c6 818, and c4 820 are determined based on edge display metadata of the edges. Turning now to FIG. 8B, a second example node layout of a representation for a source node within a graph database in accordance with an embodiment of the invention is conceptually illustrated. The generated representation 850 is from the perspective of node c0 with related nodes c1-c6 (connected to c0 within the graph database by edges) and contains boxes c3 860, c2 862, c1 864, c2 866, c4 868, and c6 870. The size of the boxes c3 860, c2 862, c1 864, c2 866, c4 868, and c6 870 is based on the edge weight metadata for the edges connecting c0 to c1-c6, while the layout of the boxes is based on the edge display metadata. The edge display metadata indicates that box c3 860 should appear to the upper left of box c1 864, while the edge display metadata for box c5 862 indicates that it should appear to the lower left of box c1 864. Similarly, the edge display metadata indicates that box c6 870 should appear to the upper right of box c1 864. The edge display metadata corresponding to box c4 868 indicates that node layout should appear under box c6 870 and the edge display metadata for box c2 866 indicates that the box should appear below box c4 868. In this way, the generated representation 850 includes a generated node layout based on relative positions of node representations.

Figure 11:
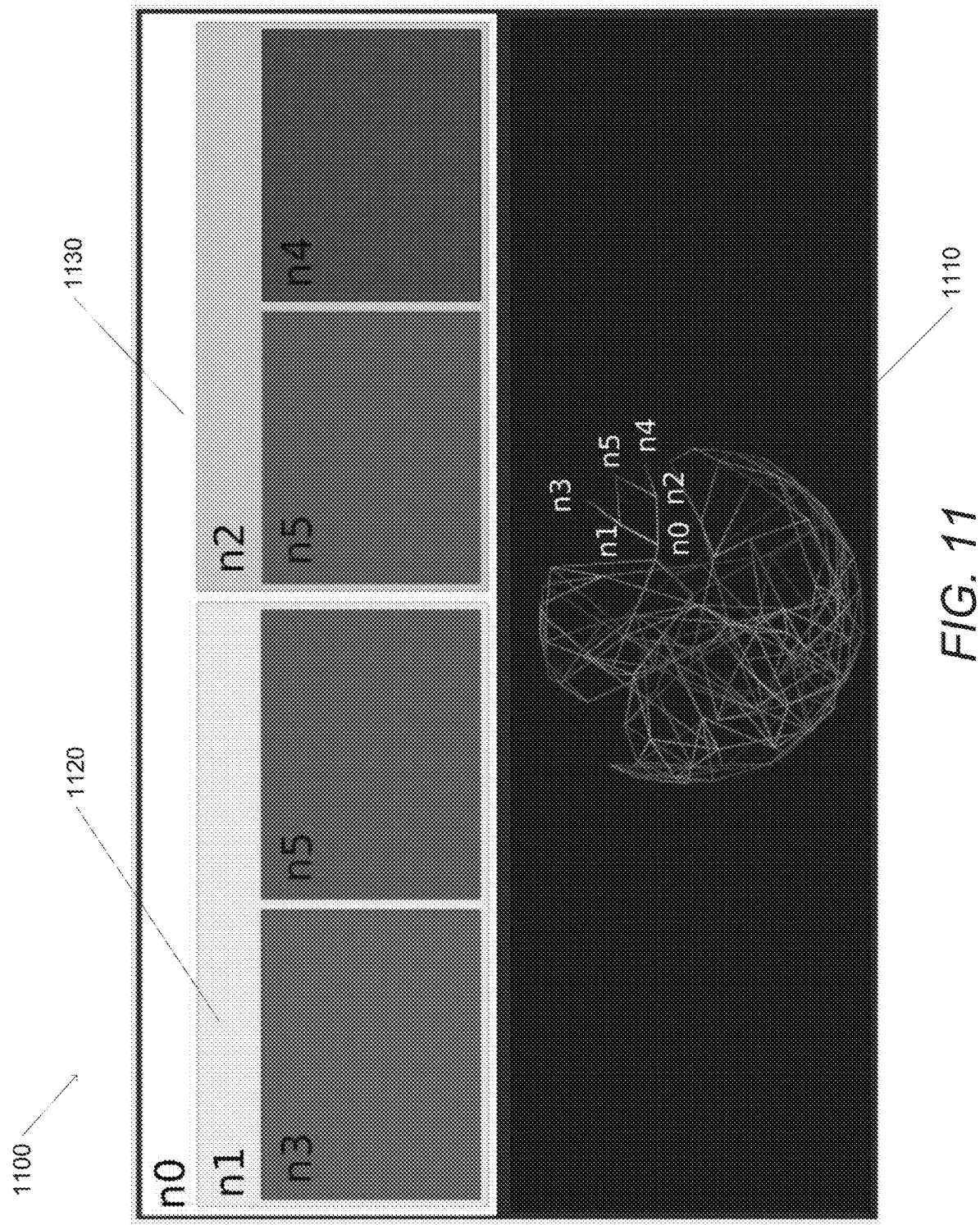
FIG. 11 is a conceptual illustration of overlapping nodes within different recursive perspectives in accordance with an embodiment of the invention.

Turning now to FIG. 11, a conceptual illustration of overlapping nodes within different recursive perspectives in accordance with an embodiment of the invention is shown. The graph database visualization user interface 1100 includes a visualization 1110 of the graph database from the perspective of node n0 along with node representation 1120 from the perspective of node n1 and node representation 1130 from the perspective of node n2. Sub-nodes n1, n2, n3, n4, and n5 are within the perspective of node n0, where nodes n3 and n5 are connected to node n1 and nodes n4 and n5 are connected to node n2. The node representation 1120 for node n1 includes a visualization of nodes n3 and n5, while the node representation 1130 for node n2 includes a visualization of nodes n4 and n5. In this way, the overlapping node n5 is shown in multiple recursive perspectives (i.e. node representation 1120 and node representation 1130).

Returning now to FIG. 4, determining the relative spatial positions of the nodes in the generated (418) layout includes parsing a binary string. The binary string can be generated for a node based on just the edge connected to the node and/or determined based on the node and its predecessor nodes. The following algorithm can be utilized to generate (418) a layout by comparing binary strings:
1) The bits of the binary strings are compared until a differing bit is found
2) If that difference bit is in an even placement, the generated (418) node layout is split horizontally.
3) Otherwise, the generated (418) node layout is split vertically.

For more than two nodes, all nodes are compared until a difference is detected; once the difference is detected, the set of nodes is split into sub-groups until pairwise groups emerge and the above algorithm can be utilized. It should be noted, however, that any technique for generating a layout can be utilized as appropriate to the requirements of specific applications of embodiments of the invention. In many embodiments, any sortable quantity, inasmuch as it may be converted into a binary number, can also be used as a method for identifying location(s) in which to split horizontally and/or vertically to be used in accordance with the processes described above. Furthermore, any set of sortable quantities that can be converted into binary numbers and/or interleaved into a single binary number or concatenated into a single binary number can also be utilized.

Figure 13:
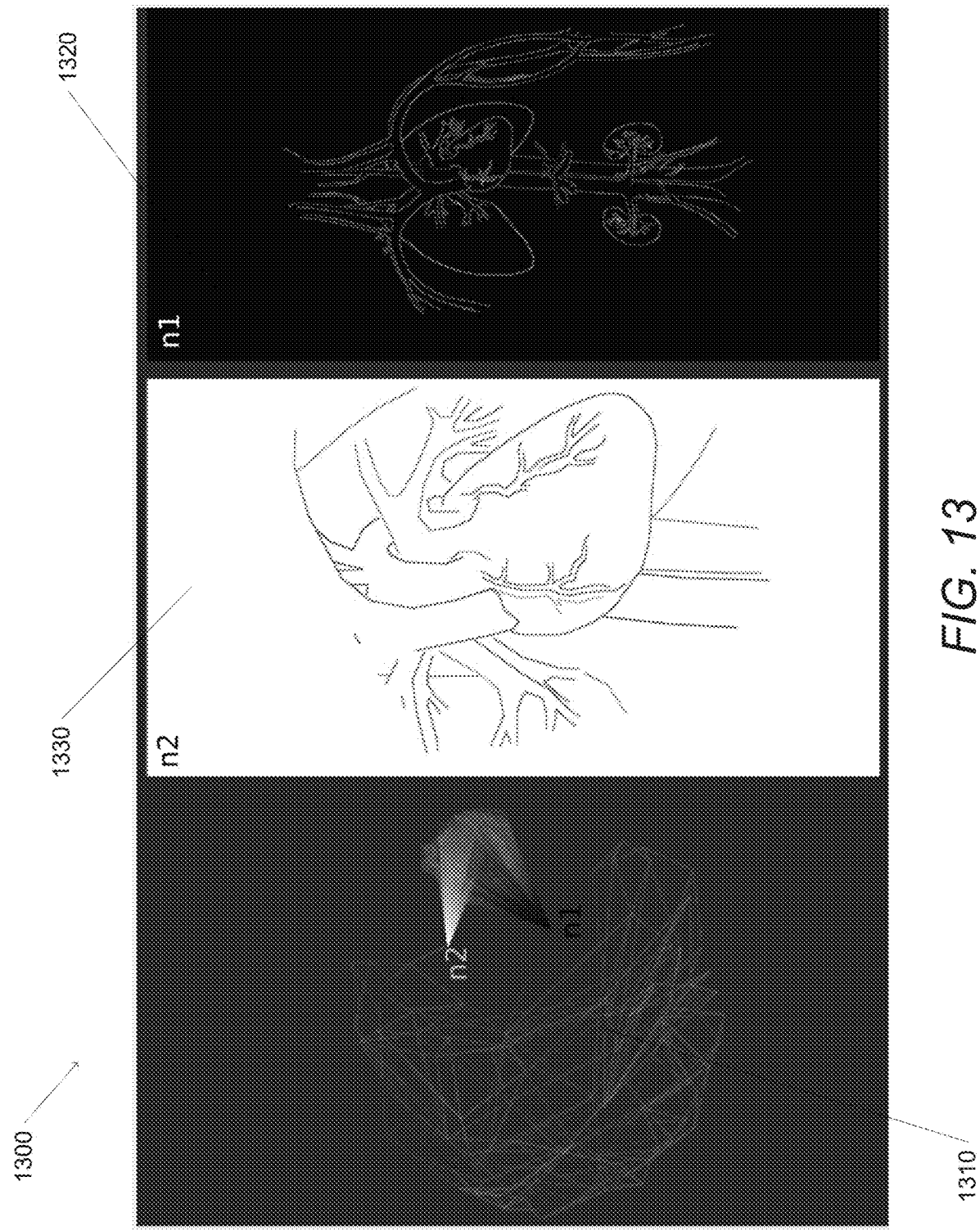
FIG. 13 is a conceptual illustration of a subgraph interpretable as image data in one or more perspectives in accordance with an embodiment of the invention.

In a variety of embodiments, one or more of the nodes in the generated (418) layout can include image data that can be displayed. Similarly, a subgraph of nodes can be interpreted as image data in the visual representation of a particular portion of the graph database. Turning now to FIG. 13, a conceptual illustration of a subgraph interpretable as image data in one or more perspectives in accordance with an embodiment of the invention is shown. The graph database user interface 1300 includes a visualization of graph database 1310 along with image data generated based on the subgraphs for nodes n1 and n2. The node representation 1320, from the perspective of node n1, includes image data forming an image of a heart and lungs based on the nodes and edges in the subgraph visible from the perspective of node n1. Similarly, node perspective 1330, from the perspective of node n2, includes image data forming an image of the heart from based on the nodes and edges in the subgraph visible from the perspective of node n2. In this way, nodes and edges in the graph database can be interpreted as pixels within a piece of image data. This allows for the nodes and edges to be visualized as an image along with facilitating the encoding of image data (i.e. compressed and/or uncompressed image data) as nodes and edges within a graph database.

Specific examples of node layouts for a specific perspective from the perspective of a source node within a graph database is conceptually illustrated in FIGS. 8A, 8B, and 11; however, the above is by way of example only and a variety of node layouts, source nodes, and graph databases can be utilized in accordance with embodiments of the invention. Similarly, while a specific example of generating image data based on a subgraph from the perspective of a source node is conceptually illustrated in FIG. 13, any image data and any images can be stored and generated as appropriate to the requirements of specific applications in accordance with embodiments of the invention. Although specific processes for the visualization of graph databases are discussed above with respect to FIG. 4, any of a variety of processes, including those utilizing graph representations differing from those described above and those utilizing alternative techniques to generate node layouts, can be performed in accordance with embodiments of the invention. Processes for manipulating and approximating graph databases in accordance with embodiments of the invention are described below.

Manipulating Graph Databases

Figure 5:
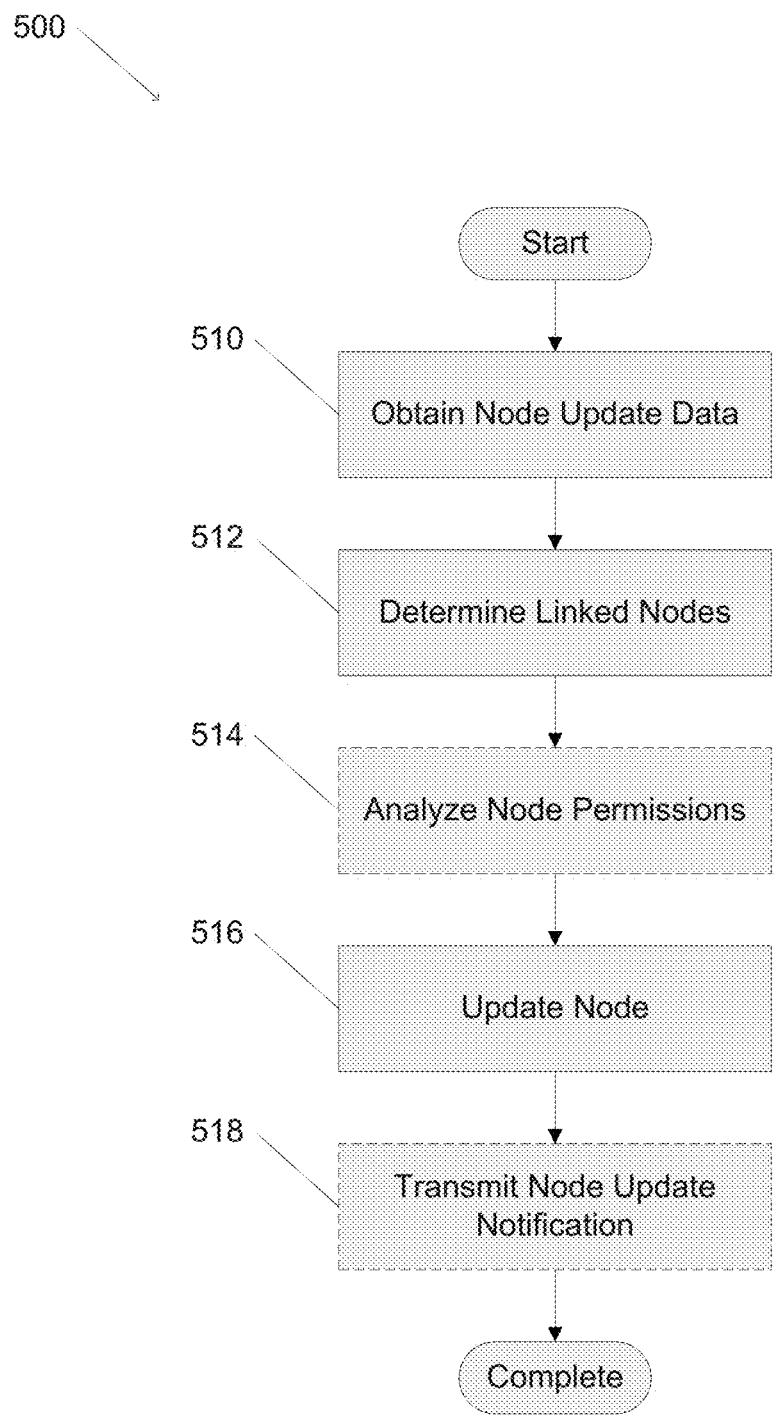
FIG. 5 is a flow chart conceptually illustrating a process for manipulating a graph database in accordance with an embodiment of the invention.

By exploring a representation of a graph database, a user can wish to add, modify, and/or remove data within the graph database and/or modify the layout of the generated representation. These modifications should be propagated to the graph database so that the new data is available to other users and/or in future explorations of the graph database. Graph database manipulation devices in accordance with embodiments of the invention are configured to modify graph databases based on manipulations of the representation of the graph database. A process for manipulating a graph database in accordance with an embodiment of the invention is conceptually illustrated in FIG. 5. The process 500 includes obtaining (510) node update data. Linked nodes are determined (512). In a number of embodiments, node permissions are analyzed (514). The node is updated (516) and, in several embodiments, a node update notification is transmitted (518).

A node update includes a target node and changed data metadata indicating the properties of the node and/or edges connected to the node to be updated. In several embodiments, a node update is obtained (510) from an input device included in a graph database manipulation device. The changed data metadata can include any update to the node metadata, edge weight metadata, and/or the edge display metadata as appropriate to the requirements of specific applications in accordance with embodiments of the invention. These updates include, but are not limited to, shifting the layout of nodes within a generated representation, transforming the size, rotation, and/or shape of nodes within a generated representation, changing the color of one or more nodes (e.g. data brushing), adding and/or removing edges between nodes within the graph database, adding and/or removing nodes within the graph database, modifying node metadata describing the concept associated with a node, and adding, modifying, or removing aggregations present in one or more nodes within the graph database. Other node updates, including combinations of the described node updates and other updated not specifically described, can be utilized as appropriate to the requirements of specific applications in accordance with embodiments of the invention. Node update data can also indicate to which node(s) the update should be applied; node updates can be applied to a single node and/or edge, the entire graph database, and/or one or more subgraphs within the graph database as appropriate to the requirements of specific applications in accordance with embodiments of the invention. In several embodiments, the node updates are only applied to a particular perspective of a node and/or the nodes available to a particular graph database manipulation device. Node updates can be customized and/or based on a template related to the particular properties of the nodes and/or edges being modified in the node update.

In a variety of embodiments, a node update is obtained (510) from one or more nodes within the graph database. Determining (512) linked nodes includes identifying the target node for the update and recursively identifying related nodes within the graph database utilizing techniques similar to those described above. In many embodiments, permission metadata is analyzed (514) to determine if a particular node and/or edge will perform and/or transmit the obtained (510) node update data. Updating (516) a node and/or edge includes adding, removing, and/or modifying metadata associated with the node and/or edge. In a number of embodiments, updating (516) a node includes modifying edge weight metadata for an edge connected to the node by computing a new complex number based on the previous edge weight metadata and the obtained (510) node update. In several embodiments, updating (516) a node includes modifying edge display metadata for an edge connected to the node by computing a new binary string based on the previous edge display metadata and the obtained (510) node update. The transmission (518) of node update notifications can be performed by passing messages between the nodes. In a variety of embodiments, node update notifications are transmitted (518) to nodes (or nodes having edges) to which the node update should be performed. The transmission (518) of node update notifications allows for the distributed (and parallel) processing of node updates across multiple nodes within the graph database, including those nodes that are stored in a distributed fashion. Transmitting (518) node update notifications can include a delay based on various locking techniques within distributed systems and/or latency associated with the transmission and/or application of the node updates. In many embodiments, the generated representation of the graph database is refreshed before, during, or after the transmission (518) of the node update notification(s).

Figure 9A:
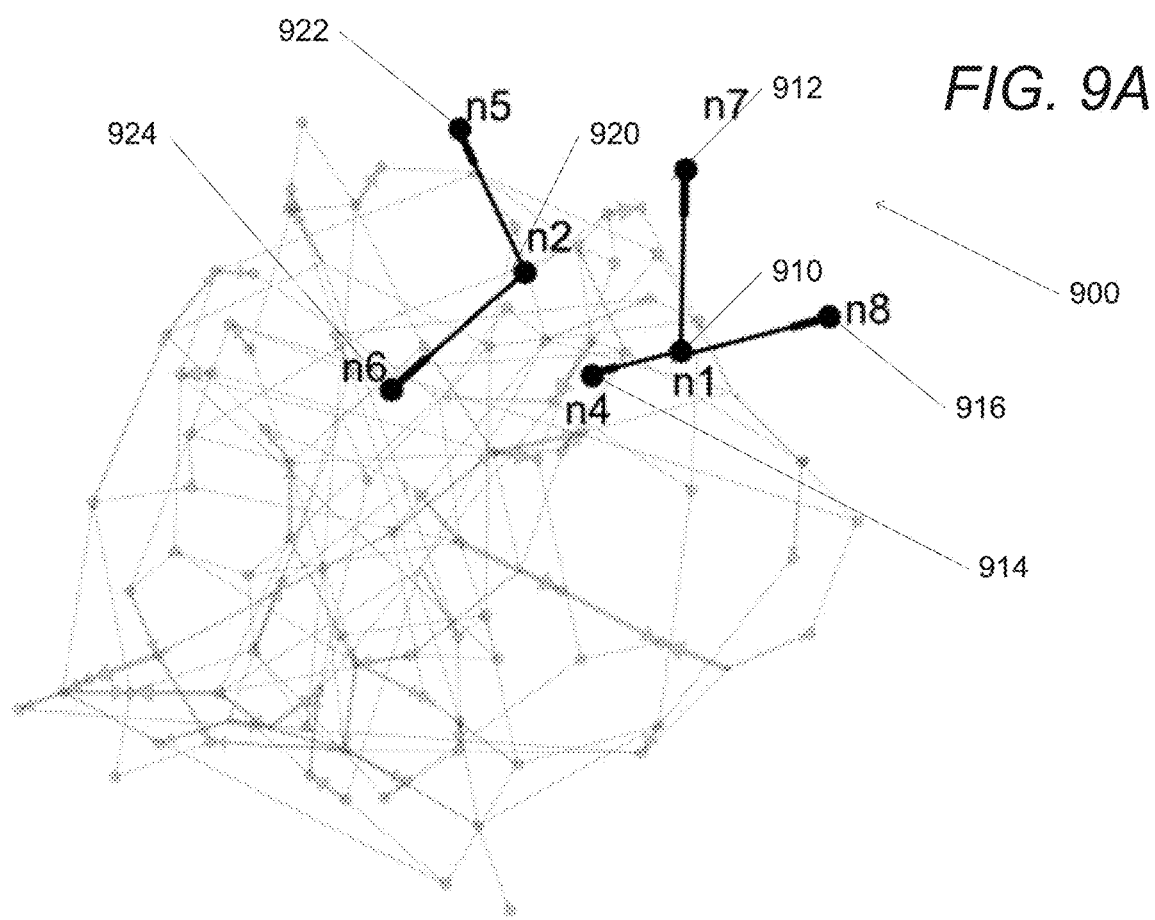
FIGS. 9A and 9B conceptually illustrate a visualization of a representation of a graph database in accordance with an embodiment of the invention.
Figure 9B:
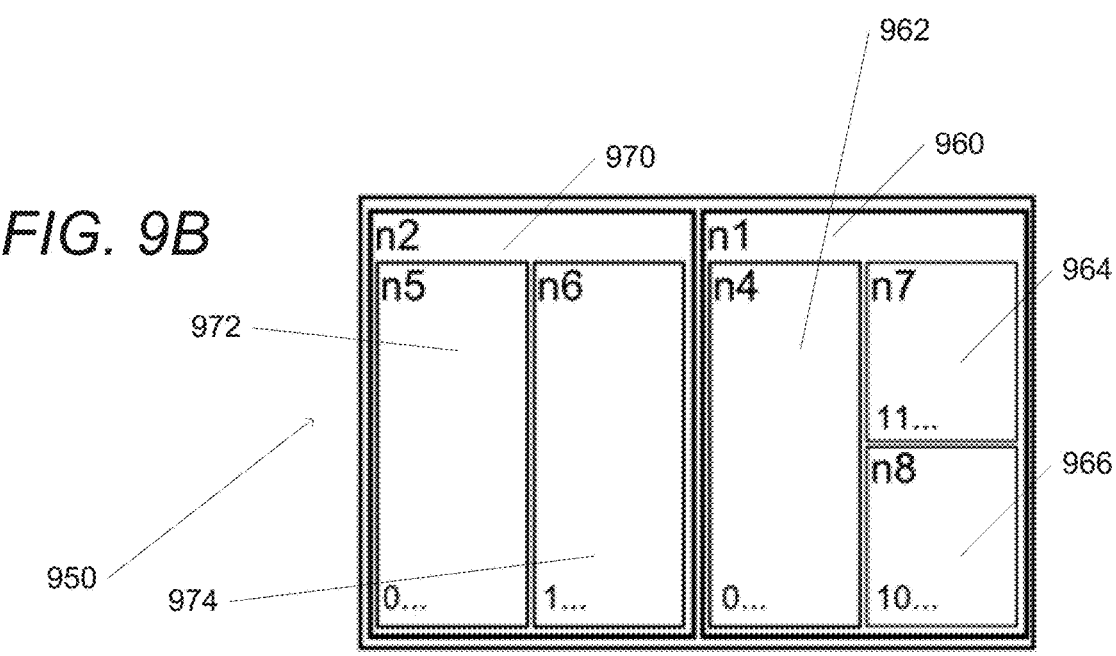

Turning now to FIGS. 9A and 9B, a graph database 900 conceptually illustrated in FIG. 9A includes nodes n1 910, n2 920, n4 914, n5 922, n6 924, n7 912, and n8 916. Nodes n5 922 and n6 924 are related to node n2 920 as indicated by the darkened edges connected to node n2 920, while nodes n4 914, n7 912, and n8 916 are related to node n1 910 as indicated by the darkened edges connected to node n1 910. Utilizing processes similar to those described above, the edge weight metadata and the edge display metadata for the connecting edges is utilized to generate the representation 950 with node layouts n1 960, n2 970, n4 962, n5 972, n6 974, n7 964, and n8 966 that is conceptually illustrated in FIG. 9B.

Figure 10A:
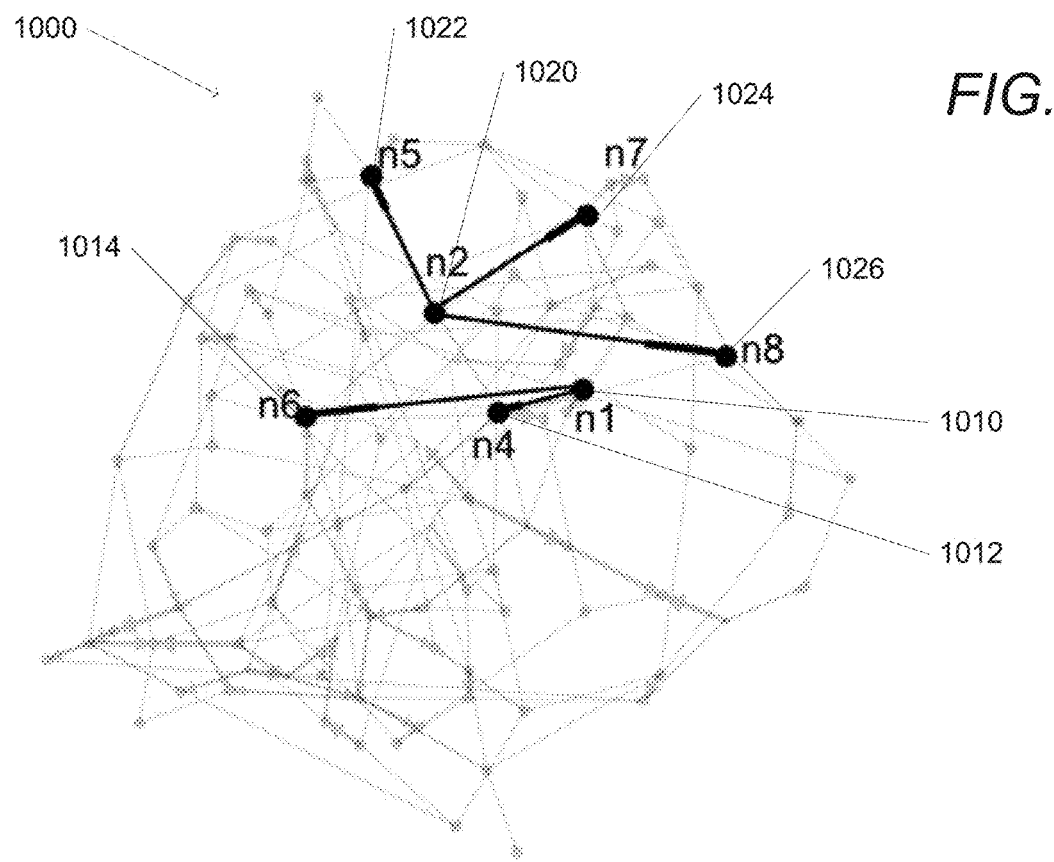
FIGS. 10A and 10B conceptually illustrate modifications to a generated representation of a graph database in accordance with an embodiment of the invention.
Figure 10B:
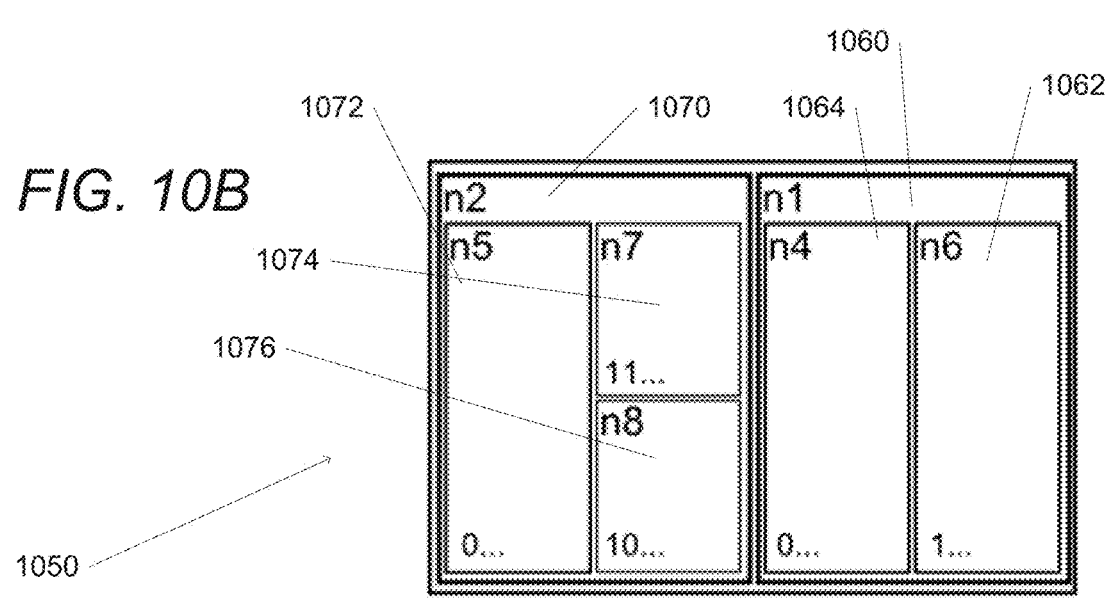

Turning now to FIGS. 10A and 10B, several node updates have been performed to the graph database 900 and the generated representation 950 utilizing processes similar to those described above. In the conceptually illustrated generated representation 1050 shown in FIG. 10B, input has been received that has moved node layouts n7 1074 and n8 1076 to fall within node layout n2 1070, while node layout n6 1062 is now associated with node layout n1 1060. Node layouts n7 1074 and n8 1076 appear to the right of node layout n5 1072 while node layout n8 1076 continues to appear below node layout n7 1074. Likewise, node layout n4 1064 is positioned to the left of node layout n6 1062. These node updates performed to the generated representation of the nodes have been passed to the various nodes within the graph database 1000 and result in recursively applied updates to the graph database 1000. The graph database 1000 conceptually illustrated in FIG. 10A includes nodes n1 1010, n2 1020, n4 1012, n6 1014, n5 1022, n7 1024, and n8 1026. As compared to FIG. 9A, node n1 1010 has deleted edges between nodes n7 1024 and n8 1026, while adding an edge with node n6 1014. Similarly, nodes n7 1025 and n8 1026 have added edges with node n2 1020, while node n2 1020 has removed its edge with node n6 1014. The edge weight metadata and the edge display metadata for the edges connecting nodes n1 1010, n2 1020, n4 1012, n6 1014, n5 1022, n7 1024, and n8 1026 are similarly updated to reflect the new positioning of the node layouts corresponding to the nodes.

Figure 12A:
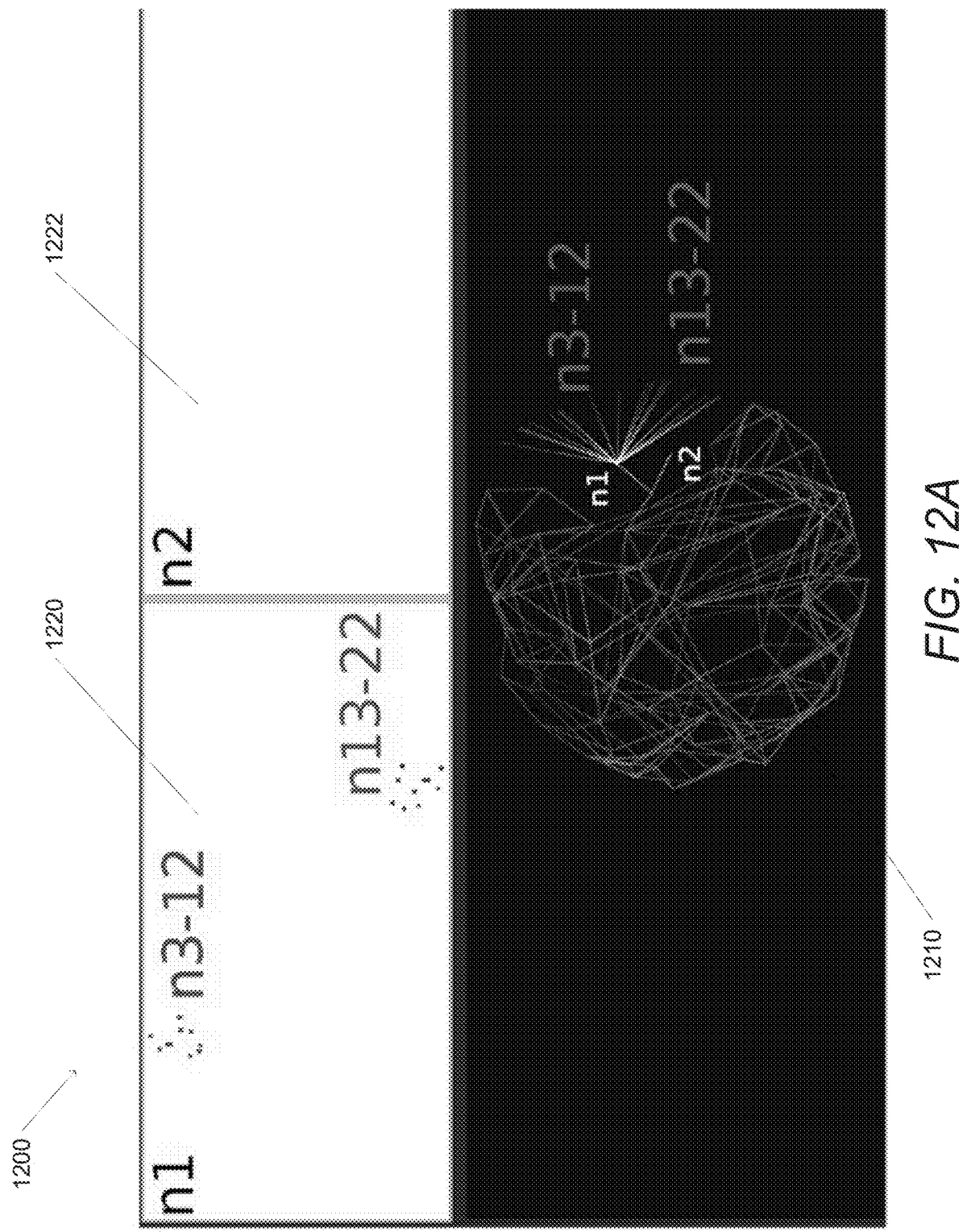
FIGS. 12A-12C are conceptual illustrations of set operations leading to the partitioning of two clusters in accordance with an embodiment of the invention.
Figure 12B:
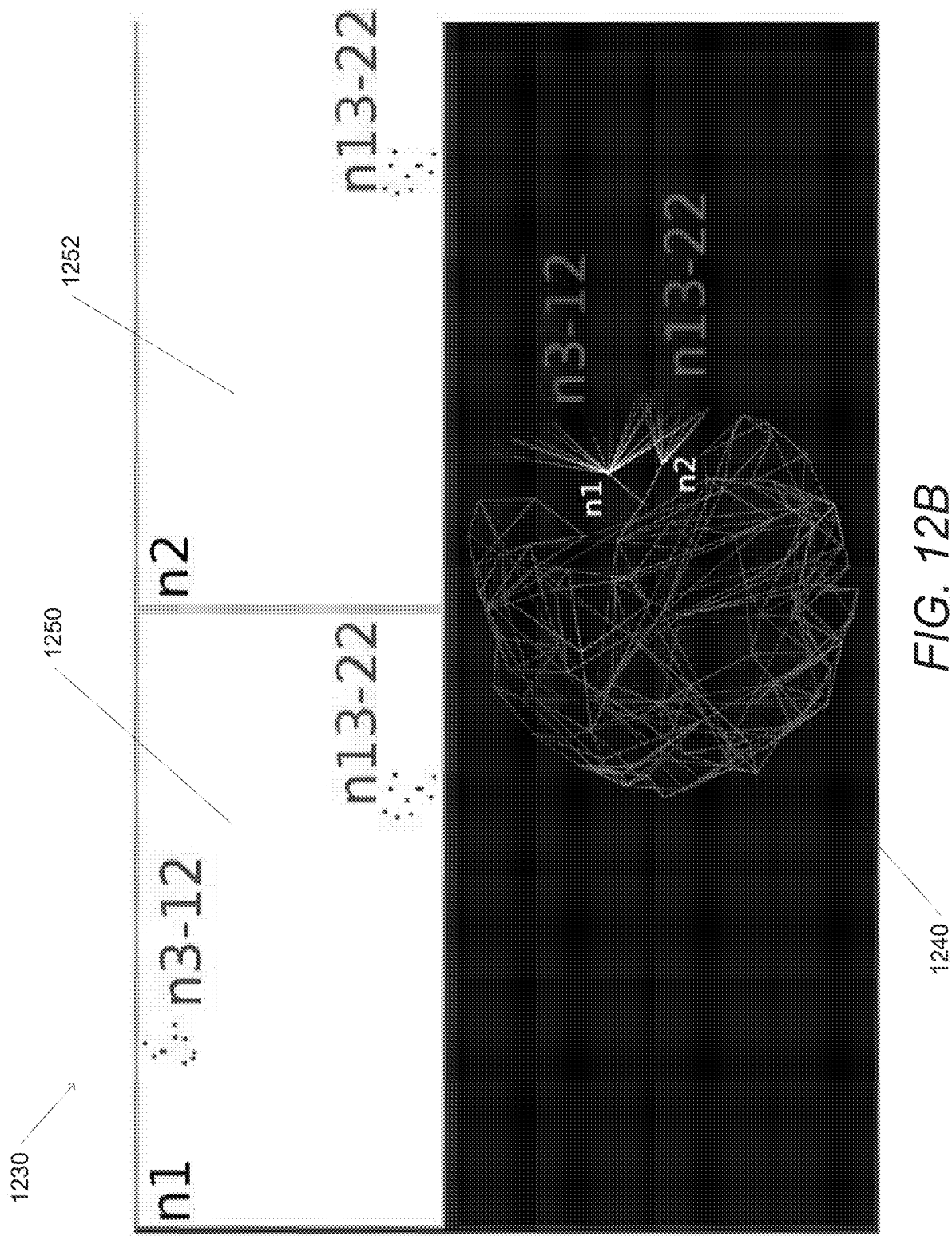
Figure 12C:
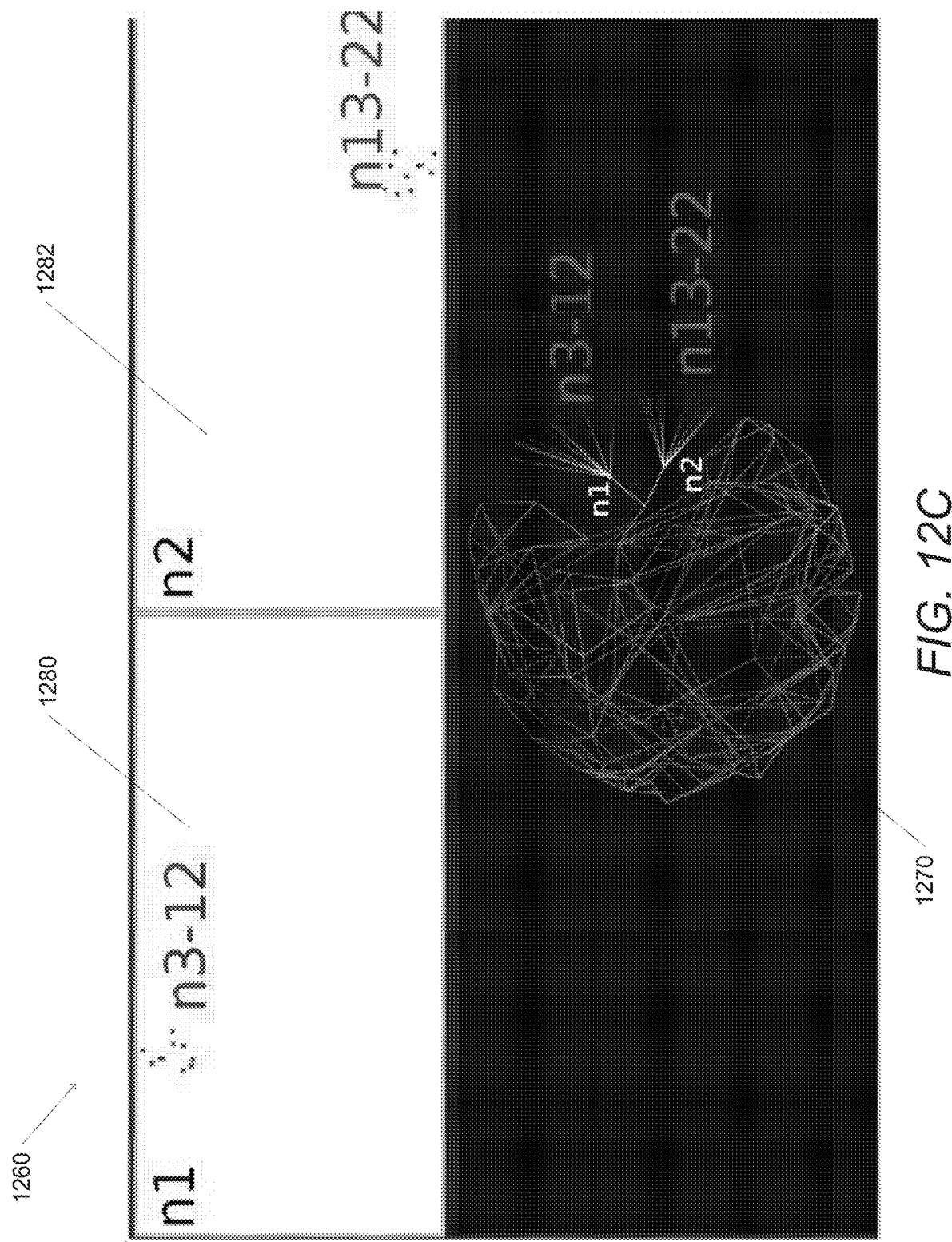

Turning now to FIGS. 12A, 12B, and 12C, conceptual illustrations of operations leading to the partitioning of two clusters in accordance with an embodiment of the invention are shown. In FIG. 12A, graph database user interface 1200 includes a graph database 1210 including nodes n1 and n2 having related subgraphs n3-12 and n13-22. In graph database 1210, both subgraphs n3-12 and n13-22 are related to node n1. Node representation 1220 conceptually illustrates that subgraphs n3-12 and n13-22 are contained in the perspective of node n1, while no subgraphs are included in the node perspective 1222 for node n2. Turning to FIG. 12B, the graph database user interface 130 includes graph database 1240 that is substantially similar to graph database 1210 with the addition of edges indicating a relationship between node n2 and subgraph n13-22. Node representation 1250 illustrates that subgraphs n3-12 and n13-22 are related to node n1; node representation 1252 illustrates that subgraph n13-22 is related to node n2. In a variety of embodiments, the relationships between node n2 and subgraph n13-22 can be formed by manipulating graph database 1210 to include the additional edges in graph database 1240. Turning now to FIG. 12C, the graph database user interface 1260 includes graph database 1270 along with node representation 1280 and node representation 1282. In graph database 1270, the relationships between node n1 and subgraph n13-22 have been removed. Accordingly, node representation 1280 illustrates that node n1 is related to subgraph n3-12; node representation 1282 illustrates that node n2 is related to subgraph n13-22. Similar to the interaction above, graph database 1250 can be manipulated to form graph database 1270 by removing the edges indicating the relationship(s) between node n1 and subgraph n13-22.

Although specific examples of generated perspectives from the perspective of a source node within a graph database and updates to that perspective are conceptually illustrated in FIGS. 9A, 9B, 10A, 10B, and 12A-12C, the above is by way of example only and a variety of node layouts, source nodes, graph databases, and modifications can be utilized in accordance with embodiments of the invention. Specific processes for manipulating graph databases are discussed above with respect to FIG. 5; however, any of a variety of processes, including those that do not recursively manipulate the graph database, can be performed in accordance with embodiments of the invention. Processes for approximating graph databases in accordance with embodiments of the invention are described below.

Approximating Graph Databases

Figure 6:
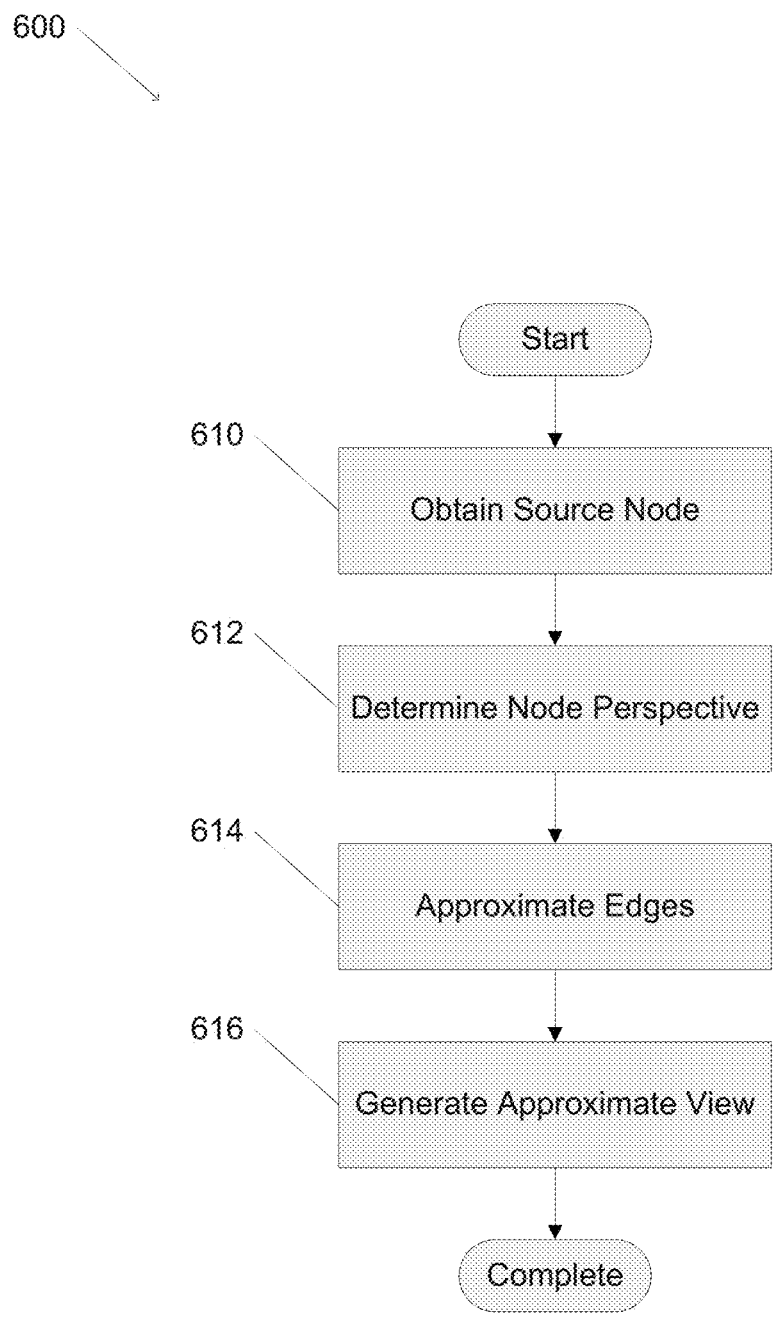
FIG. 6 is a flow chart conceptually illustrating a process for approximating a graph database in accordance with an embodiment of the invention.

Graph database with a high degree of dimensionality (e.g. a large number of nodes and edges) can provide a large amount of information that negatively influences the ability to explore the graph database and gain insights into the data. Similarly, graph databases with a high degree of dimensionality can exceed the computational power and/or storage of many computing devices. By generating an approximation to the graph database, the information stored in the graph database can be more easily processed, explored, and manipulated. Particular portions of the approximate database can be used to identify regions of interest within the full graph database for further exploration in more detail. Graph database manipulation devices in accordance with embodiments of the invention are configured to generate approximations of graph databases to facilitate the processing and exploration of the graph database. A process for approximating a graph database in accordance with an embodiment of the invention is conceptually illustrated in FIG. 6. The process 600 includes obtaining (610) a source node. The perspective of the source node is determined (612). Edges are approximated (614) and an approximate view is generated (616).

In a variety of embodiments, a source node is obtained (610) utilizing processes similar to those described above. In several embodiments, determining (612) the perspective of the source node utilizes processes similar to those described above. Edges can be approximated (614) utilizing a variety of techniques as appropriate to the requirements of specific applications in accordance with embodiments of the invention. These techniques include, but are not limited to, random sampling of nodes within a particular distance from the obtained (610) source node, sampling nodes based on the number of edges connected to the nodes related to the source node, analyzing priority metadata and/or permission metadata associated with the nodes and/or edges, and aggregating nodes and/or edges to generate an approximate graph from the perspective of the obtained (610) source node. The aggregation of nodes and/or edges can also be performed based on the layout of the nodes within a generated representation of the source node and the related nodes within the graph database. For example, if the generated representation of a set of nodes would be too small for a user to effectively explore, the nodes can be aggregated so that useful information can still be analyzed by the user.

In many embodiments, edges are approximated (614) utilizing smart sampling techniques. Smart sampling techniques in accordance with embodiments of the invention include determining outlier nodes. Outlier nodes include nodes with few spatial neighbors, nodes with long edges, and/or nodes with high divergence. The length of an edge can be determined based on a variety of criteria, such as the distance between nodes within a visualized representation of the graph database, a latency associated with traversing the edge, edge weight metadata associated with the edge, and/or computed based on the edge weight metadata and/or the edge display metadata. In a variety of embodiments, the weight of an edge is determined by computing the squared complex weight based on the edge weight metadata. In several embodiments, edges can be incorporated into the graph database within a visualization using a variety of techniques. These techniques include, but are not limited to, preferentially sampling edges that will be drawn over empty space, preferentially sampling for edges between nodes that are separated by empty space, or any other techniques as appropriated to the requirements of specific applications of the invention. A heuristic algorithm can be utilized to determine the nodes to be sampled based on the properties of the node (e.g. the contents of the node and/or the time the node was last updated) and/or the edges connected to the node, such as the longest incoming or outgoing edge for a given node. In a number of embodiments, generating (616) the approximate view can be based on the approximated (614) edges and the obtained (610) source node utilizing processes similar to those described above. Other techniques for the smart sampling of nodes and edges to approximate (614) edges within a graph database from the perspective of a source node can be utilized as appropriate to the requirements of specific applications in accordance with embodiments of the invention.

In a variety of embodiments, a localized approximation (such as a Voronoi decomposition, or binary tree of spatial relationships between groups) can be utilized to approximate and/or cluster a subgraph in space, by partitioning the graph database into partial segments related within Cartesian space and/or the graph structure itself. Nodes and edges within a partition can be identified, selected, and manipulated by the user as a group. In one embodiment, a spatial cursor representing a user effector could quickly identify and select a spatial subsegment of a viewed subgraph, which could then be operated on as a group (moved in space or re-linked to another cluster), according to the wishes of the user. According to the wishes of the user, the selected spatial subsegment could also be refined by further manipulations, such as allowing the cursor to hover over the same spatial location.

In a variety of embodiments, a localized subset of the graph database can be employed as a localized approximation or projection of a graph database by partitioning the graph database into partial segments related within the graph database manipulation device. In a variety of embodiments, this type of approximation or clustering is done to maintaining the graph over disparate hardware. In a variety of embodiments, these segments can be identified via an automated mechanism for identifying minimal graph cuts for partitioning the graph, or simply via a threshold of locality around a source node. In a variety of embodiments, when a source node is selected within the graph database manipulation device, the nodes and edges within the partial segment of the graph containing the source node can be utilized by the graph database manipulation device as an approximation of the graph database for the purpose of display and further computation. As the partial segment is explored within the graph database manipulation device, the view and content of the partial segment can be changed to continue representing the graph locally.

Specific processes for the approximation of graph databases are discussed above with respect to FIG. 6; however, any of a variety of processes, including approximation and/or sampling techniques not described above, can be performed in accordance with embodiments of the invention. Processes for processing messages using nodes within the graph database in accordance with embodiments of the invention are discussed below.

Processing Node Messages

Figure 7:
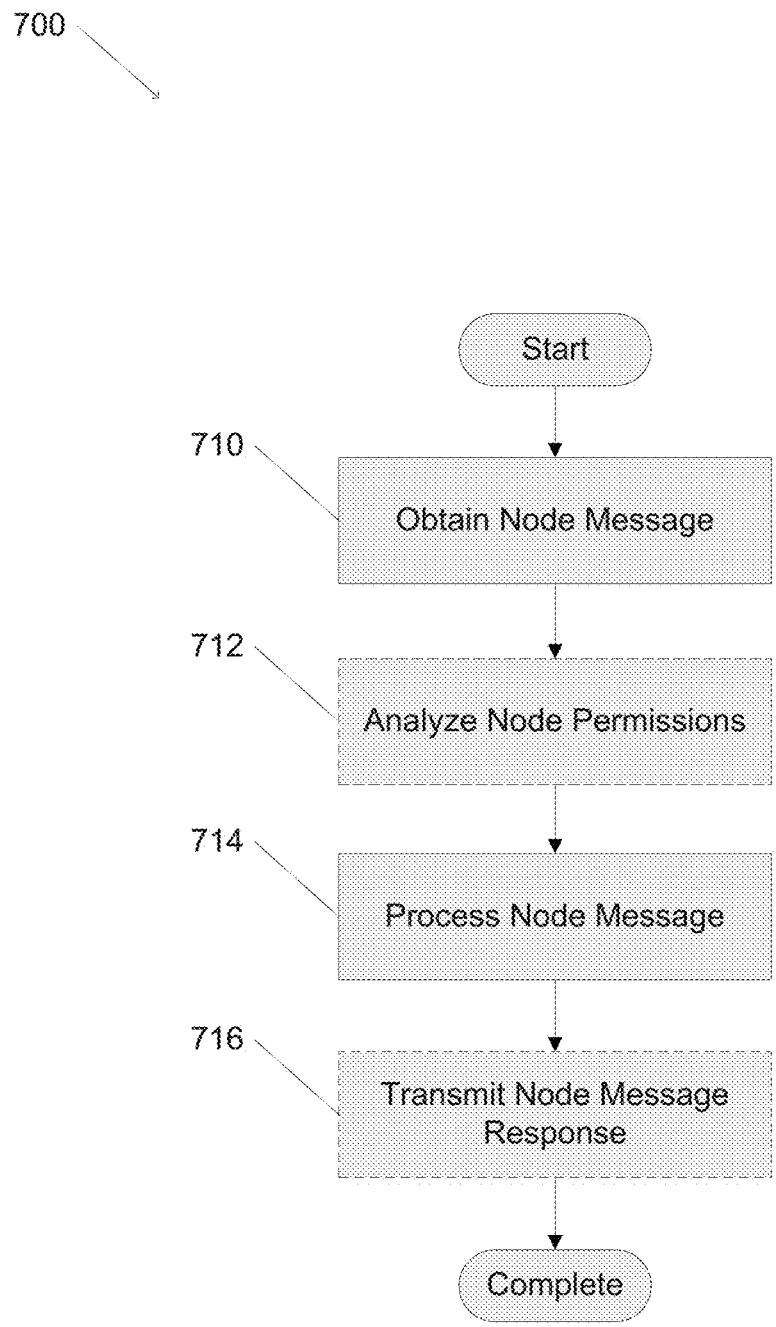
FIG. 7 is a flow chart conceptually illustrating a process for processing a node message in accordance with an embodiment of the invention.

Nodes within a graph database can be configured to provide a variety of information based on requests for that information. This information can be taken from the node itself and/or from related nodes connected to the node. The information provided by a node can be influenced by the node requesting the information, providing a security mechanism for only providing data to those nodes with permissions to view the data. Graph database manipulation devices in accordance with embodiments of the invention are configured to transmit, process, and receive node messages. A process for processing node messages in accordance with an embodiment of the invention is conceptually illustrated in FIG. 7. The process 700 includes obtaining (710) a node message. In many embodiments, node permissions are analyzed (712). The node message is processed (714). In a variety of embodiments, a node message response is transmitted (716).

A node message contains data request metadata indicating the desired data from the node receiving the node message. In a number of embodiments, the node message includes metadata identifying the node transmitting the node message and/or the intended node(s) to receive the message. In several embodiments, a node message is obtained (710) via a network connection and/or from an input device included in a graph database manipulation device. In a number of embodiments, a node message is obtained (710) from another node within the graph database. In many embodiments, node permissions are determined (712) based on permission metadata for the node obtaining (710) the node message. In a number of embodiments, the node permissions are determined (712) based on the graph database manipulation device visualizing the graph database; other node permissions can be determined (712) as appropriate to the requirements of specific applications in accordance with embodiments of the invention.

Processing (714) the node message includes determining the data requested within the node message based on the data request metadata. In a variety of embodiments, determining the requested data includes calculating additional data based on the data available to the node obtaining (710) the node message. The available data can include data present within the node and/or data present in other nodes connected to the node within the graph database. To retrieve data from other nodes within the graph database, additional node messages requesting the data from the other nodes can be created and transmitted by the node obtaining (710) the node message. In a number of embodiments, additional nodes are brought into the perspective of the node obtaining (710) the node message in order to request and receive the data needed to prepare the requested data. In many embodiments, a node message response including the requested data is created and transmitted (716). The node message response can also include metadata describing the sender and intended recipients of the node message response along with permission metadata describing access to the requested data. The transmission (716) of a node message response can be performed utilizing processes similar to those described above.

In a variety of embodiments, messages sent between nodes can be used as a method to augment a node's perspective. A source node within the graph, connected via edges to a field of additional successor nodes, requests from it successors data about their outgoing edges. If the criteria for permissions are met, according to the above descriptions for the interaction between messages and permissions metadata, successor nodes can transmit to the original node data about their own outgoing edges and successors, turning second-order successors into first-order successors. In this way, the perspective of a source node can grow, augmenting the domain over which it can have an effect on the larger graph.

Specific processes for processing node messages are discussed above with respect to FIG. 7; however, any of a variety of processes not described above can be performed in accordance with embodiments of the invention.

Although the present invention has been described in certain specific aspects, many additional modifications and variations would be apparent to those skilled in the art. For example, any of the various processes described above can be performed in alternative sequences and/or in parallel (on different computing devices) in order to achieve similar results in a manner that is more appropriate to the requirements of a specific application of the invention. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A graph database manipulation device comprising:
at least one processor;
a memory connected to the at least one processor and storing a graph database manipulation application; and
a display device in communication with the at least one processor;
wherein the graph database manipulation application directs the at least one processor to:
obtain a graph database, wherein the graph database comprises:
a set of nodes; and
a set of edges, wherein an edge in a set of edges defines a relationship between a first node in the set of nodes and a second node in the set of nodes and an edge comprises:
edge weight metadata; and
edge display metadata, wherein the edge display metadata describes the spatial relationship between the first node and the second node;
determine a source node;
generate a set of approximated nodes by partitioning the graph database into partial segments within the graph structure;
calculate a set of approximated edges between the source node and the set of approximated nodes based on the edge weight metadata and the edge display metadata;
generate an approximate view of the graph database based on the set of approximated nodes and the set of approximated edges.

2. The graph database manipulation device of claim 1, wherein the source node comprises a node in the set of nodes.

3. The graph database manipulation device of claim 1, wherein the source node comprises a node not present within the graph database virtually linked to at least one node within the graph database.

4. The graph database manipulation device of claim 1, wherein each approximated node in the set of approximated nodes represents at least one node in a region of the graph database.

5. The graph database manipulation device of claim 1, wherein a spatial cursor representing a user effector selects at least one partial segment.

6. The graph database manipulation device of claim 1, wherein the graph structure is represented in Cartesian space.

7. The graph database manipulation device of claim 1, wherein the set of approximated nodes comprises at least one node representing an aggregation of a subset of nodes in the set of nodes.

8. The graph database manipulation device of claim 1, wherein generating a set of approximated nodes comprises obtaining a random sampling of nodes in the set of nodes within a distance from the source node.

9. The graph database manipulation device of claim 1, wherein generating the set of approximated nodes comprises obtaining a sampling of nodes in the set of nodes based on the number of edges between nodes in the set of nodes and the source node.

10. The graph database manipulation device of claim 1, wherein generating the set of approximated nodes comprises analyzing metadata.

11. The graph database manipulation device of claim 10, wherein the metadata comprises priority metadata.

12. The graph database manipulation device of claim 1, wherein calculating an edge in the set of approximated edges comprises calculating the squared complex weight based on edge weight metadata.

13. The graph database manipulation device of claim 1, wherein the graph database manipulation application further directs the at least one processor to:
   determine a second source node;
   generate a second set of approximated nodes;
   calculate a second set of approximated edges between the second source node and the second set of approximated nodes based on the edge weight metadata and the edge display metadata;
   generate a second approximate view of the graph database based on the second set of approximated nodes and the second set of approximated edges.

14. The graph database manipulation device of claim 13, wherein the display switches from displaying the first approximate view of the graph database to displaying the second approximate view of the graph database.

15. The graph database manipulation device of claim 1, wherein the display is connected to the graph database manipulation device via a network.

16. The graph database manipulation device of claim 1, wherein the graph database manipulation application further directs the processor to display the approximate view of the graph database using the display device.

17. The graph database manipulation device of claim 1, wherein the graph database manipulation application further directs the processor to generate approximated edge weight metadata.

18. The graph database manipulation device of claim 1, wherein the graph database manipulation application further directs the processor to generate an approximate view of the approximated graph database.

19. The graph database manipulation device of claim 1, wherein the at least one processor comprises at least one graphics processing unit.

20. A method for manipulating a graph database comprising:
   obtaining a graph database, wherein the graph database is stored on a memory connected to at least one processor, and wherein the graph database comprises:
      a set of nodes; and
      a set of edges, wherein an edge in a set of edges defines a relationship between a first node in the set of nodes and a second node in the set of nodes and an edge comprises:
         edge weight metadata; and
         edge display metadata, wherein the edge display metadata describes the spatial relationship between the first node and the second node;
   determining a source node using the at least one processor;
   generating a set of approximated nodes by partitioning the graph database into partial segments within the graph structure using the at least one processor;
   calculating a set of approximated edges between the source node and the set of approximated nodes based on the edge weight metadata and the edge display metadata using the at least one processor.

* * * * *